(12) United States Patent
Yanagihara

(10) Patent No.: US 8,059,669 B2
(45) Date of Patent: Nov. 15, 2011

(54) TREE-TYPE BROADCAST SYSTEM, RECONNECTION PROCESS METHOD, NODE DEVICE, NODE PROCESS PROGRAM, SERVER DEVICE, AND SERVER PROCESS PROGRAM

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 513 days.

(21) Appl. No.: 12/285,994

(22) Filed: Oct. 17, 2008

(65) Prior Publication Data

US 2009/0116412 A1 May 7, 2009

(30) Foreign Application Priority Data

Nov. 2, 2007 (JP) ................................ 2007-285973

(51) Int. Cl.
*H04L 12/28* (2006.01)
*H04L 12/56* (2006.01)
(52) U.S. Cl. ........................................................ 370/408
(58) Field of Classification Search .................. None
See application file for complete search history.

(56) References Cited

U.S. PATENT DOCUMENTS

| 7,185,077 | B1 | 2/2007 | O'Toole et al. | |
|---|---|---|---|---|
| 2004/0205219 | A1 | 10/2004 | Li et al. | |
| 2006/0259607 | A1* | 11/2006 | O'Neal et al. | 709/223 |

FOREIGN PATENT DOCUMENTS

JP   A-2006-319466   11/2006

OTHER PUBLICATIONS

Padmanabhan, Venkata N. et al.; "Distributing Streaming Media Content Using Cooperative Networking" NOSSDAV '02, XP-001171549; May 12, 2002, pp. 177-186.
Jannotti, John et al., "Overcast: Reliable Multicasting with an Overlay Network," Cisco Systems, Jan. 1, 2000, pp. 8-11.
Hosseini, Mojtaba et al., "A Survey of Application-Layer Multicast Protocols," IEEE Communications Surveys, pp. 58-74 3$^{rd}$ Quarter, vol. 9, No. 3, 2007.
First Office Action for corresponding Chinese Patent Application No. 200810174736.5, mailed on Mar. 15, 2011 (w/ English translation).

* cited by examiner

*Primary Examiner* — Chirag G Shah
*Assistant Examiner* — Minh-Trang Nguyen
(74) *Attorney, Agent, or Firm* — Oliff & Berridge, PLC

(57) ABSTRACT

A node device in a tree-type broadcast system having hierarchy levels of node devices while locating a broadcast device at its top, whereby information is sequentially transferred from a higher hierarchy level to a lower hierarchy level, the node device including:
 a means for receiving connection destination candidate information, broadcasted from the node device in the higher hierarchy currently connected or from the broadcast device;
 a means for specifying a node device suitable as a reconnection destination candidate out of the connection destination candidate information;
 a means for memorizing network address information, being the reconnection destination candidate; and
 a means for selecting one node device memorized in the reconnection destination candidate memory means as the reconnection destination and connecting to it when the connection to the node device or the broadcast device is released and the own node device is newly reconnected to another node device.

12 Claims, 20 Drawing Sheets

CONSTRUCTION EXAMPLE OF CONNECTION DESTINATION CANDIDATE PACKET P

FIG.10

EXAMPLE OF RECONNECTION CANDIDATE MANAGEMENT TABLE

| GLOBAL IP | LOCAL IP | NAT TRAVERSAL ATTRIBUTE | DOWNSTREAM CONNECTION NUMBER | HIERARCHY LEVEL VALUE | CACHE TIME |
|---|---|---|---|---|---|
| 218.227.161.XXX | 192.168.1.4 | UPnP+TCP | 1 | 21 | 2007/10/01:12:11:34.120 |
| 60.32.117.XXX | 192.168.1.32 | UDP hole punching | 1 | 14 | 2007/10/01:12:11:30.11 |
| 202.213.233.XXX | 192.168.11.14 | UPnP+UDP | 0 | 5 | 2007/10/01:12:11:32.45 |
| 61.193.2.XXX | 192.168.1.5 | TCP Client | 1 | 6 | 2007/10/01:12:11:34.120 |
| 210.188.32.XXX | 192.168.11.6 | UDP hole punching | 0 | 11 | 2007/10/01:12:11:30.11 |

TREE-TYPE BROADCAST SYSTEM, RECONNECTION PROCESS METHOD, NODE DEVICE, NODE PROCESS PROGRAM, SERVER DEVICE, AND SERVER PROCESS PROGRAM

The entire disclosures of Japanese Patent Application No. 2007-285973 filed on Nov. 2, 2007 including the specification, claims, drawings and summary are incorporated herein by reference in its entirety.

BACKGROUND OF THE INVENTION

1. Field of the Invention

The present invention relates to a peer-to-peer (P2P) type communication system including a plurality of node devices mutually communicable through a network.

2. Discussion of Related Art

As this kind of system, there is known a technique of so-called application layer multicast (ALM) which relays to deliver a content stream while broadcast (deliver) routes of the content data are managed at an application layer. In this ALM, packets generated from content data files are relayed in real time between node devices, thereby delivering content data broadcasted from a broadcast station (broadcast device) to arbitrary node devices (multicast).

In a case of reconnection to a new upper hierarchy node device triggered by quality deterioration of receiving stream (content stream from the node device of the upper hierarchy) or withdrawal (separation) of the upper hierarchy (upstream) node device, the node device participating in a topology formed under such ALM uses a method where the node device requests a connection destination introduction server managing topology to thereby acquire network address information of a connection destination candidate and uses this to reconnect, or a method that the node device autonomously reconnects in use of network address information of the connection destination candidate which respective node devices exchange with each other and store. It is often the case that either of the above methods is used.

By the former method, because an appropriate connection destination candidate can be introduced from entire topology information collected in real time by the connection destination introduction server, it is possible to carry out a robust connection process in use of the connection destination candidate. However, since burden loaded on the connection destination introduction server increases in a case where a lot of node devices participate in the topology, there is a problem that the system tends to be unstable in its entirety.

By the latter method, since reconnection is carried out in use of network address information that respective node devises exchange with neighbor node devices, burden is not loaded on the connection destination introduction server for acquiring the connection destination candidate. However, since it is difficult to select an appropriate connection destination candidate from the entire topology, there is a high possibility that a connection trial on a node device to be a connection destination candidate is failed to necessitate retrial of connection.

Further, Patent Document 1 discloses that a connection destination introduction server manages a predetermined number of connection destination candidates with respect to every attribute information of the node devices, and the node device which desires participation in a topology and accompanies the own attribute information requests the connection destination introduction server to thereby acquire a connection destination candidate. By this method, the node device requests a node device to be connected for connection in use of network address information of the connection destination candidate which is acquired from the connection destination introduction server in response to the connection destination candidate acquisition request, and the connection is established in a case where the node device to be connected permits connection. According to this method, the appropriate connection destination candidate is not selected in the connection destination introduction server but the node device to be connected responds whether or not the connection is permitted, after judging conditions of the node device requesting connection in detail. Therefore, it is possible to reduce a load related to the process for the connection destination introduction server to select the appropriate candidate.

[Patent Document 1] Japanese Unexamined Patent Publication No. 2006-319466

SUMMARY OF THE INVENTION

Meanwhile, in a case where, in the method disclosed by Patent Document 1, the connection is rejected by the node device to be connected, the connection process is tried again and a topology in an entire system cannot be necessarily stabilized. Because, for example, the connection process requires much time, topology is segmented, and the period while the content stream is not supplied to a lower hierarchy node device becomes long.

The present invention is provided in consideration of the above problems. An object of the present invention is to provide a tree-type broadcast system, a reconnection process method, a node device, a node process program, a server device, and a server process program, which enable to provide a candidate having optimality equal to that of the connection destination candidate, obtained from the connection destination introduction server, and stabilizes topology, while reducing loads in the connection destination introduction server managing the topology.

To solve the above problem, according to an invention described in Claim 1, there is provided a node device in a tree-type broadcast system formed by participation of a plurality of node devices to fabricate a plurality of hierarchy levels while locating a broadcast device at a top of the plurality of hierarchy levels and connecting the node devices in a tree-like shape through a communication means, whereby information broadcasted by the broadcast device is sequentially transferred from a node device at a higher hierarchy level to a node device at a lower hierarchy level, the node device including:

a connection destination candidate information receiving means for receiving connection destination candidate information, which is broadcasted from a node device in a higher hierarchy currently connected with the own node device or from the broadcast device, indicates a node device to be a reconnection destination candidate, and includes at least network address information of the node device to be the reconnection destination candidate;

a reconnection destination candidate specifying means for specifying a node device suitable for its own attribute information as a reconnection destination candidate for the own node device out of the node devices indicated in the connection destination candidate information thus received;

a reconnection destination candidate memory means for memorizing at least network address information of the node device, being the reconnection destination candidate thus specified; and a connection processing means for carrying out a connection process of selecting one node device out of the node devices memorized in the reconnection destination candidate memory means as the reconnection destination and connecting to the one node device based on the network address information of the node device as the reconnection destination, in a case where the connection of the own node device with the node device in the higher hierarchy level or the broadcast device is released and the own node device is newly reconnected to another node device.

According to the present invention, it is possible to restrict inquiry by the node device to be reconnected to a connection destination introduction server managing topology. Accordingly, it is possible to provide each node with a candidate accompanied by optimality equal to a candidate of connection destination, obtained from the connection destination introduction server, while reducing load applied to the connection destination introduction server, whereby the topology is stabilized.

According to the present invention, inquiry by the node device being reconnection to the connection destination introduction server that manages the topology can be reduced. Therefore, it is possible to provide a candidate having optimality equal to that of the connection destination candidate obtained from the connection destination introduction server and to stabilize the topology, while reducing loads on the connection destination introduction server (restraining load concentration).

BRIEF DESCRIPTION OF THE DRAWINGS

FIG. 10 is a view showing an example of connection destination candidate information registered in a connection candidate management table.

DESCRIPTION OF THE PREFERRED EMBODIMENTS

Figure 1:
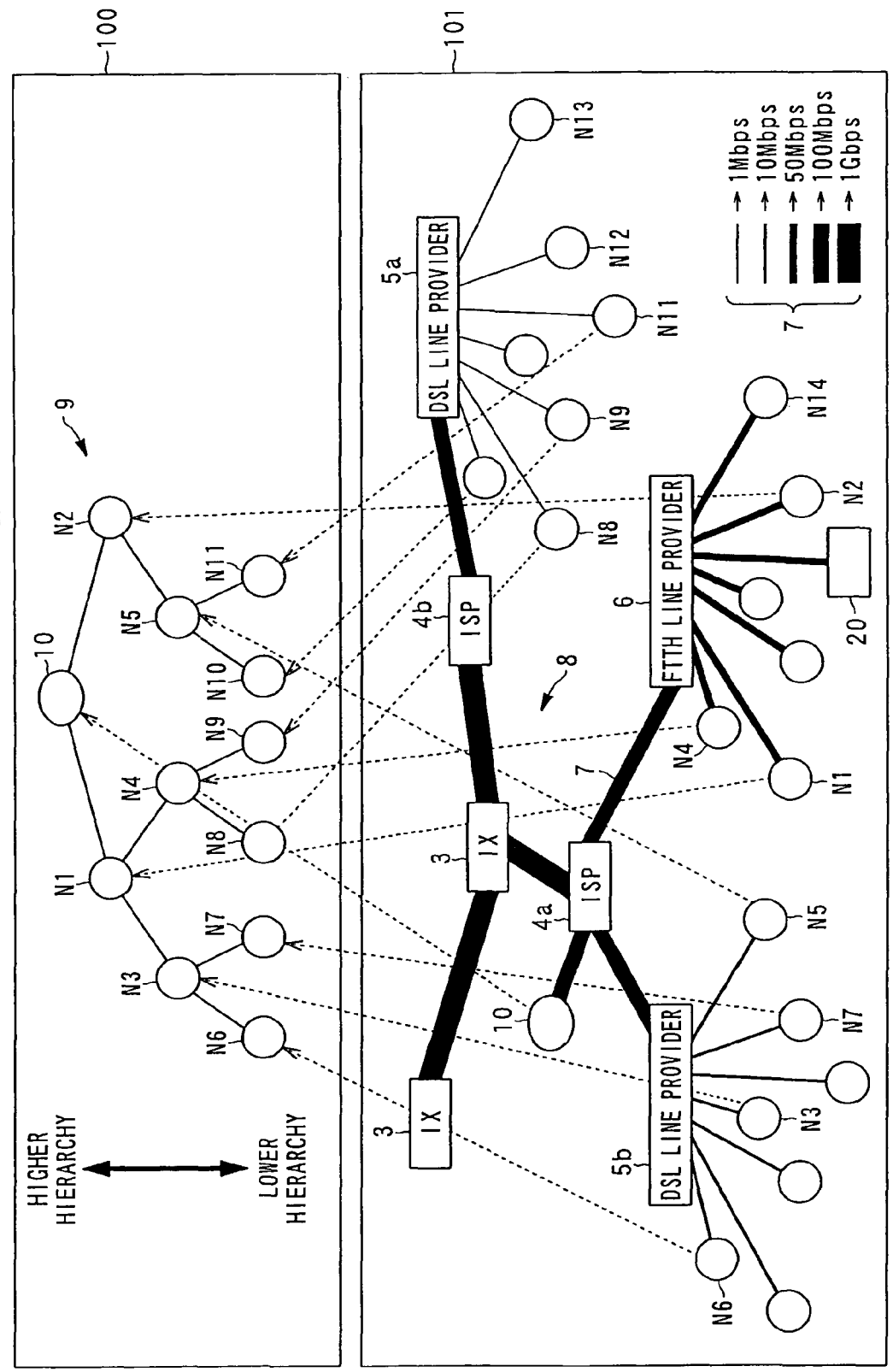
FIG. 1 is a view showing an example of a connection status of respective node devices in a tree-type broadcast system according to the present embodiment.

Hereinafter, an embodiment of the present invention will be described based on figures. Each designation of numerical reference in the drawings is typically as follows:

8: Network;
9: Overlay network;
10: Broadcast station;
20: Connection destination introduction server;
101, 201, 301a: Main power;
301b: Auxiliary power
102, 202, 302: Main memory unit;
103, 203, 303: Hard disk unit;
104, 204, 304: CPU;
105, 205, 305: Network interface;
106, 206, 306: Peripheral unit control chip;
107, 207, 307: Video chip;
108, 308: Audio chip;
109, 208, 309: Keyboard;
110, 209, 310: Mouse;
111, 210, 311: Display;
112, 312: Built-in speaker;
113, 211, 313: System bus;
114, 212, 314: Router;
Nn: Node; and
S: Tree-type broadcast system.

Hereinafter, an embodiment of the present invention will be described in reference of FIG. 1 and others.

[1. Configuration and the Like of a Tree-Type Broadcast System]

First, with reference to FIG. 1 and others, a schematic configuration and a function of a tree-type broadcast system according to an embodiment of the present invention will be explained.

FIG. 1 is a view showing an example of connection status of respective node devices in a tree-type broadcast system according to the present embodiment.

As shown in a lower frame 101 in FIG. 1, a network (communication network in real world) 8 of the Internet or the like is constructed by an internet exchange (IX) 3, internet service providers (ISP) 4a and 4b, digital subscriber line (DSL) providers (or device thereof) 5a and 5b, fiber to the home (FTTH) line provider (or device thereof) 6, and communication line (e.g. a phone line or an optical cable) 7 and the like. Here, in the network (a communication network) 8 of the example of FIG. 1, a router for transferring data (packet) is appropriately inserted(not shown).

In such the network 8, a plurality of node devices (hereinafter referred to as "nodes") Nn (n=any one of 1, 2, 3 . . . ) are connected. Further, a node ID inherent in each node Nn is assigned to the nodes Nn.

Then, the tree-type broadcast system S according to the present embodiment is a peer-to-peer type network system formed (configured) by participation of any of plural nodes Nn, as shown in the upper frame 100 of FIG. 1. Here, a network 9 shown in the upper frame 100 of FIG. 1 is an overlay network 9 (a logical network) including a virtual link formed by use of an existing network 8.

In such the tree-type broadcast system S, plural nodes Nn participating in the system S (topology) form plural hierarchies while locating a broadcast station 10 at the top in the system, and the plural nodes are connected in a tree-like shape through a network 8. Then, content data (e.g. image data and audio data) which are broadcasted (e.g. broadcasted by streaming delivery method) from the broadcast station 10 are sequentially transferred (ALM (Application Layer Multicast)) from nodes Nn in a higher hierarchy (hereinafter referred to as "upstream") to nodes Nn in a lower hierarchy (hereinafter referred to as "downstream").

Further, a topology formed in the tree-type broadcast system S is managed by a connection destination introduction server 20. The connection destination introduction server 20 introduces an upstream node (hereinafter referred to as "upstream node"), which is a connection destination in the tree-type broadcast system S, to the node Nn in accordance with a connection destination introduction request from the node Nn.

Figure 2:
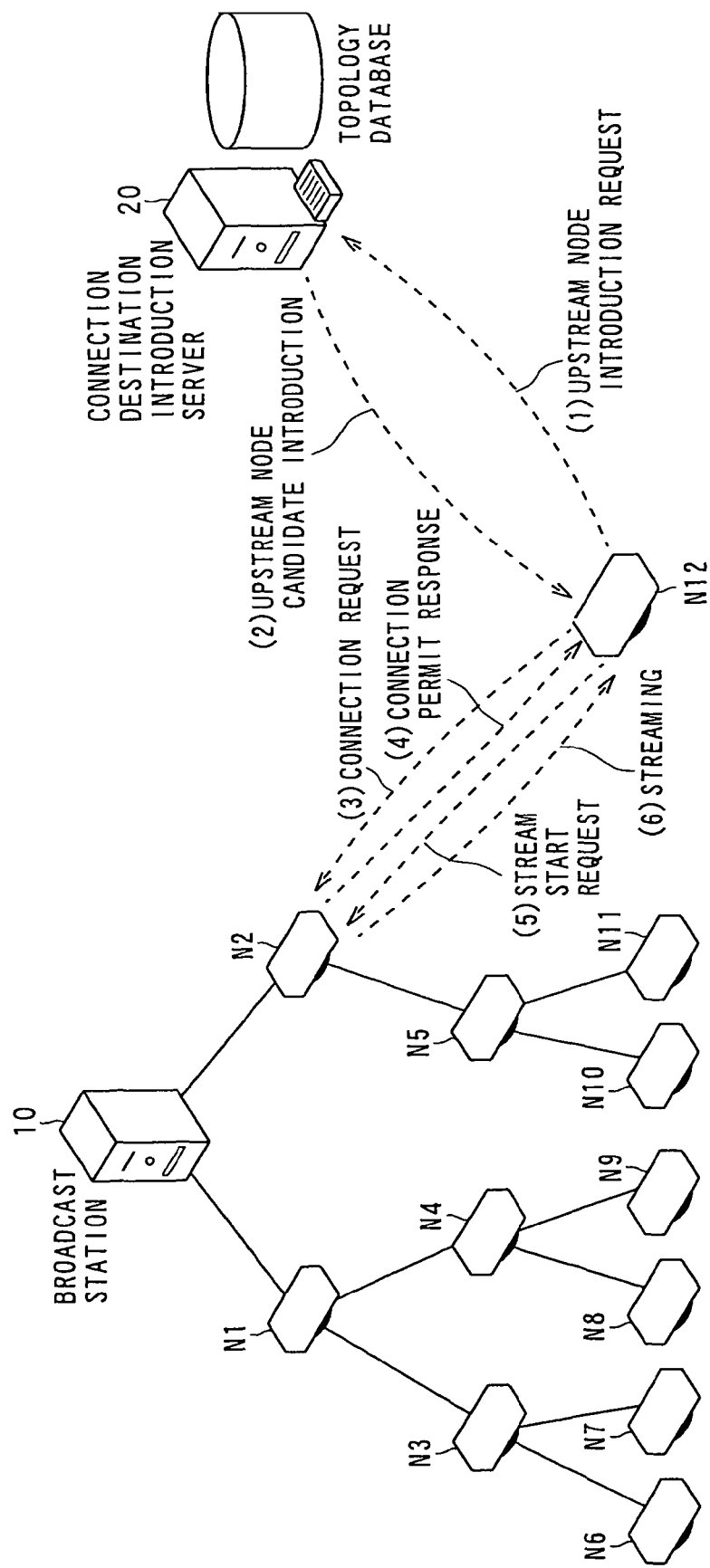
FIG. 2 is a schematic view showing a state where node N12 participates in a tree-type broadcast system S.

FIG. 2 is a schematic view showing a state that a node N12 participates in a tree-type broadcast system S.

In an example of FIG. 2, (1) in a case where the node N12 participates in the tree-type broadcast system S (in other word, participates in topology), first the node N12 sends an upstream node introduction request message to the connection destination introduction server 20.

(2) The connection destination introduction server 20 searches a node Nn connectable to the downstream side (hereinafter referred to as "downstream connection possible node", in which the number of nodes connected directly on the downstream side does not reach connection allowable number) from topology management information which is managed inside, and returns (introduces a connection possible node) to the node N12 an upstream node candidate introduction message including network address information (e.g. IP (Internet Protocol) address and port number) of upstream node candidates exceeding 1.

(3) Next, the node N12 selects one, for example a node N2, from the upstream node candidates acquired from the connection destination introduction server 20, and sends the connection request message to the node N2.

(4) Next, the node N2 adds information of the node N12 to a node management table which is managed inside, and returns a connection permit response message to the node N12 (4).

(5) Next, the node N12 sends a stream start request message to the node N2.

(6) Finally, the node N2 prepares an object for stream relay inside the device and starts streaming to the node N12.

Thus, participation of the node N12 to the tree-type broadcast system S is completed.

On the other hand, in a case where the node N12 withdraws (separates) from the tree-type broadcast system S, the node N12 sends a stream stop request message and a disconnection request message to the upstream node N2, which is a stream supplier. In response to this, the node N2 discards a stream relay object to thereby stop streaming to the node N12, and simultaneously deletes information of the node N12 from the node management table to thereby terminate connection with the node N2.

In a case where a node Nn exists on a downstream side of the withdrawing node Nn, such the downstream node Nn (hereinafter referred to as "downstream node") restores a broadcast route by either method a) or method b) described below.

a) Reproduction by Timeout Method

The state of streaming from the upstream node Nn is constantly monitored and when stream supply is suspended for a predetermined time period (occurrence of self-sustaining reconnection event), the state of connection with the upstream node Nn is discarded and a new upstream node Nn is reconnected.

b) Reproduction by Event Notification Method

When the upstream node Nn withdraws from the tree-type broadcast systems, withdrawal event is notified to a downstream node Nn directly below. When the downstream node Nn receives the withdrawal event from the upstream node Nn (occurrence of self-sustaining reconnection event), the state of connection with the upstream node Nn is discarded, and a new upstream node Nn is reconnected.

Further, respective nodes Nn participating in the tree-type broadcast system S monitor the state of receiving stream from the upstream nodes Nn, and when it becomes to have quality lower than a predetermined receipt quality (occurrence of self-sustaining reconnection event), the upstream node Nn is switched to reconnect with a new upstream node Nn. As evaluation criteria of receipt quality, an average packet rate and a packet lost rate for a past-predetermined period can be used.

Here, in the present embodiment, connection destination candidate information indicative of plural upstream nodes Nn to be a reconnection destination candidate of the above-mentioned downstream node Nn is broadcasted (delivered) as a connection destination candidate packet (included in the packet), and sequentially transferred (ALM) from the upstream to the downstream nodes Nn. In other words, the connection destination candidate packet is delivered through the same route as the delivery route of the content data.

Figure 3:
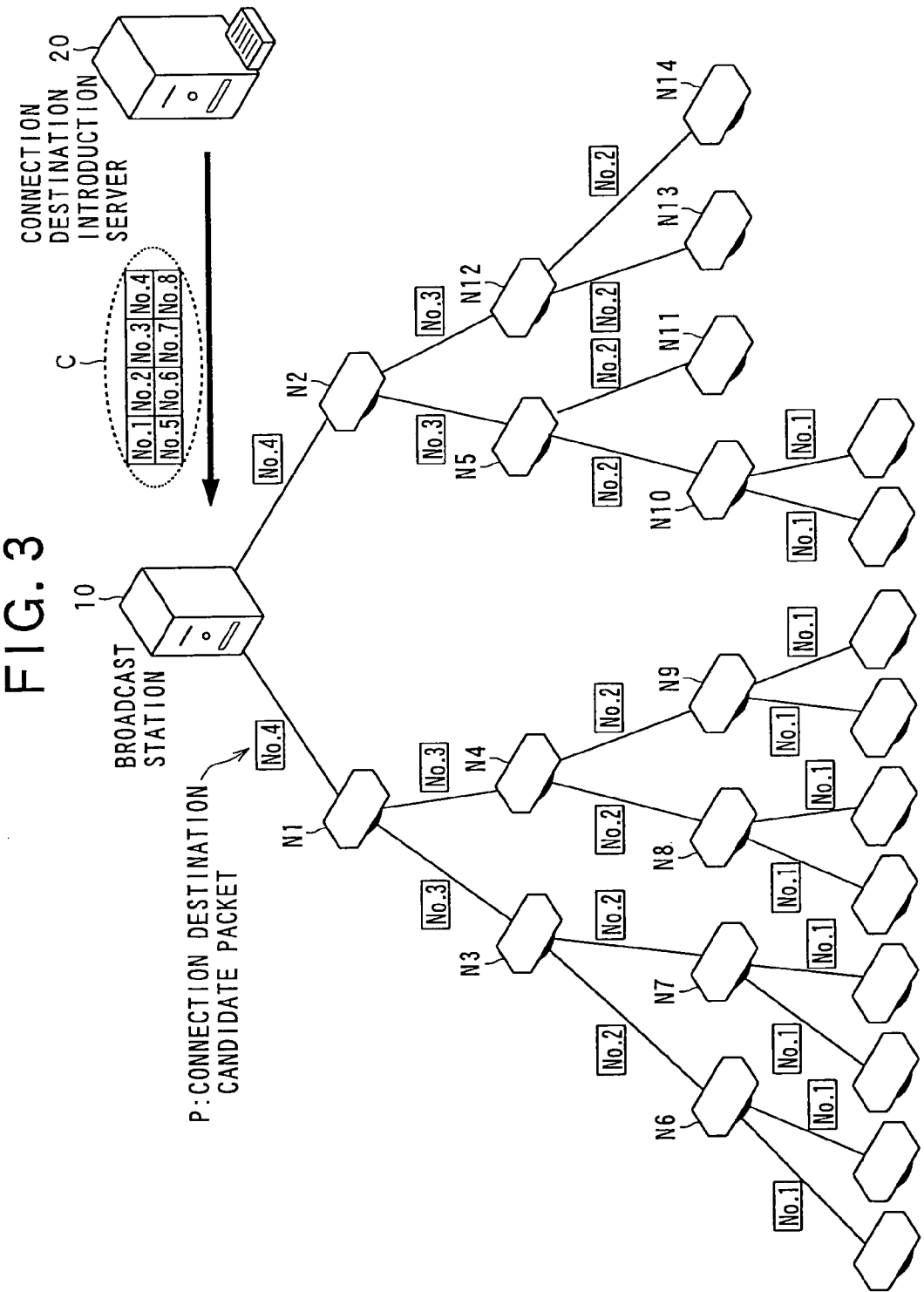
FIG. 3 is a view showing a state where a connection destination candidate packet is broadcasted from an upstream to a downstream.

FIG. 3 is a view showing a state wherein the connection destination candidate packet is broadcasted from the upstream to the downstream.

Accordingly, the connection destination candidate packet P is distributed over all of the nodes Nn participating in the topology (in the delivery route of ALM multicast). Here, in the figure, numerals (No. 1 to No. 8) indicate a delivery order.

Further, as shown in FIG. 3, the broadcast station 10 acquires a chunk (block) C including the above-mentioned connection destination candidate information for example periodically from the connection destination introduction server 20. In other words, the connection destination introduction server 20 extracts plural pieces of latest connection permit candidates from the topology management information and generates connection destination candidate information, and sends the chunk C including this to the broadcast station 10. Then the broadcast station 10 divides the connection destination candidate information included in thus acquired chunk C into plural pieces and broadcasts each of thus divided connection destination candidate information at the connection destination candidate packet P.

For example, the broadcast station 10 utilizes a time to acquire the chunk C including the next connection destination candidate information in order to broadcast the connection destination candidate packet P slowly at a constant sending speed (e.g. 128 kbps).

Figure 4:
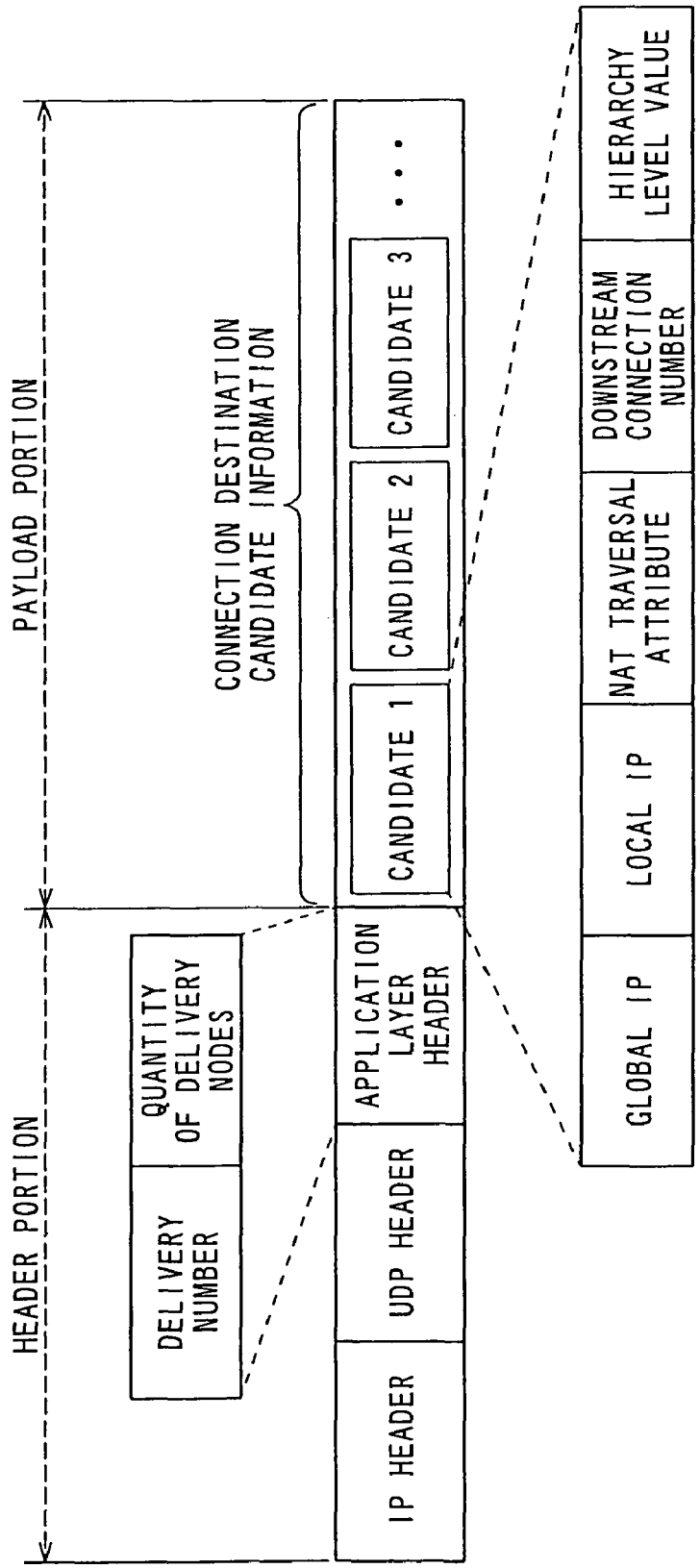
FIG. 4 is a view showing an example of a configuration of a connection destination candidate packet P.

FIG. 4 is a view showing an example of configuration of the connection destination candidate packet P.

As shown in FIG. 4, the header portion of the connection destination candidate packet P includes IP header, UDP (User Datagram Protocol) header, and application layer header and the payload portion stores the connection destination candidate information.

The connection destination candidate information stored in the payload portion includes information related to reconnection destination candidate (connection destination candidate information) by the number of the candidates (candidates 1, 2, 3 . . . in an example of FIG. 4). Further, the connection destination candidate information related to each candidate includes a global IP address, a local (private) IP address, NAT (Network Address Translation) traversal attribute (an example of information (hint) related to an NAT traversal communication method in the system S), the number of downstream connections, and a hierarchy level value (an example of information indicating hierarchy level in the system S) or the like. Here, the global IP address and the local IP address are added respectively with a port number (not shown). Further, the NAT traversal attribute, number of downstream connections and hierarchy level value are an example of attribute information.

An inherent global IP address is not always allocated to each node Nn, and there is a case where only a local IP address is allocated thereto. In this case, a known technique of NAT (Network Address Translation) is used to connect the node Nn with the network 8. In such the NAT, an NAT-compatible router mutually converts the local IP address and the global IP address so that the network 8 can be transparently connected from the node Nn, to which only the local IP address is allocated. However, in such the NAT, the node Nn inside the NAT-compatible router side (i.e. network on LAN (Local Area Network) side) cannot be directly connected from an outside of the NAT-compatible router (i.e. network on WAN (Wide Area Network) side). That is, there is a problem that a session cannot be started from the node Nn outside the NAT-compatible router to the node Nn inside the NAT-compatible router. As a communication method for solving this problem, there are techniques of traversing NAT such as "UPnP (Universal Plug and Play)" and "UDP (User Datagram Protocol) hole punching". The NAT traversal attribute included in the connection destination candidate information and related to each candidate indicates techniques of traversing NAT to deal with the node Nn (node Nn to be a reconnection destination candidate) which is allocated only with the local IP address.

Further, the number of downstream connections indicates the number of downstream nodes Nn connected directly with downstream of the node Nn, to be a reconnection destination candidate. For example in FIG. 3, a number of downstream connections of the node N2 is two: node N5 and node N12.

Further, the hierarchy level value indicates which hierarchy the node Nn to be a reconnection destination candidate is located in the topology. For example in FIG. 3, the hierarchy goes the lower from the broadcast station 10 being the top hierarchy, the hierarchy level value increases and the hierarchy level value of the node N1 and the node N2 is "1".

On the other hand, an application layer header in the header portion includes a deliver number (broadcast number) and the number of deliver nodes (the number of broadcast nodes). The delivery number is the number unified with respect to every chunk C. Accordingly, same delivery numbers are added to plural connection destination candidate packets P forming a chunk C. Further, the number of delivery nodes indicates how many pieces of reconnection destination candidates are extracted from the connection destination candidate information included in the connection destination candidate packet P broadcasted at the delivery number this time.

Although the connection destination candidate packet P thus broadcasted is sequentially transferred from an upstream to a downstream in the systems, only a predetermined time period is stored (retained) in the downstream connection possible node Nn having margin in the number of the downstream connections.

Figure 5:
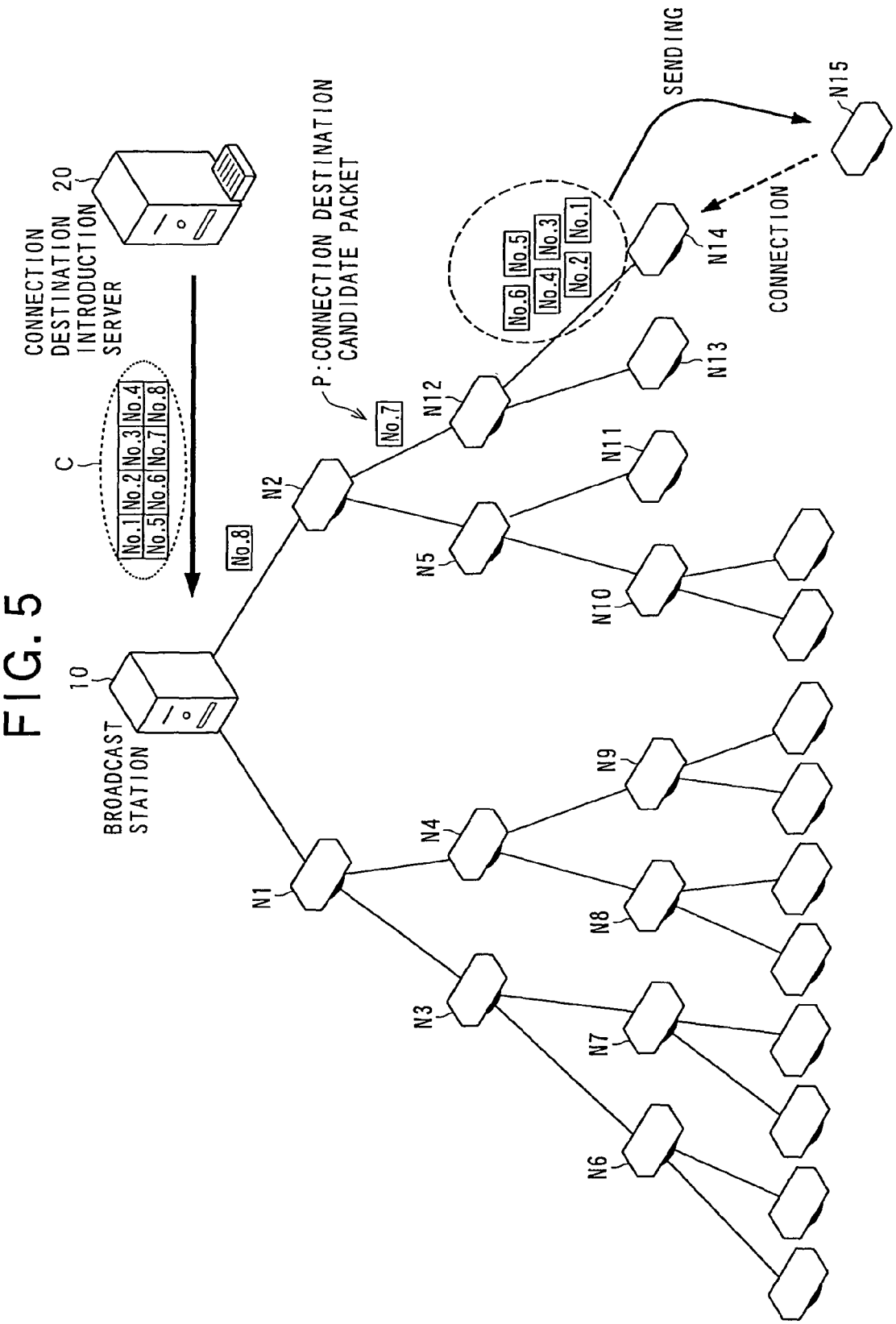
FIG. 5 is a view showing a state where connection destination candidate packet P is stored for a predetermined time period in a downstream connection possible node N14.

FIG. 5 is a view showing a state where the connection destination candidate packet P is stored for the predetermined time period in the downstream connection possible node N14.

In an example of FIG. 5, the connection destination candidate packets P (No. 1 to No. 6) thus sequentially broadcasted from the broadcast station 10 are stored in the downstream connection possible node N14. During this storing period, in a case where a new node N15 comes to be connected as a direct downstream node as shown in FIG. 5, the downstream connection possible node N14 sends the connection destination candidate packet P previously stored to the downstream node N15. Therefore, it is possible to immediately send the connection destination candidate packet P previously broadcasted to a node Nn participating in a new topology or a node Nn changing a connection destination in the same topology.

Then, the node Nn receiving the connection destination candidate packet P identifies the node Nn matching the own attribute information among nodes Nn to be a reconnection destination candidate indicated by the connection destination candidate information included in the connection destination candidate packet P as own reconnection destination candidate, and memorizes the connection destination candidate information related to the node Nn candidate (at least network address information) (registered in the connection candidate management table (described later)). Here, judgment whether or not the node Nn to be a candidate of reconnection destination indicated by the connection destination candidate information matches the own attribute information is described later in detail.

Meanwhile, in a case where respective nodes Nn release the connection with the upstream node Nn which the own node device currently connects with or the broadcast station 10 upon occurrence of an autonomous reconnection event and newly reconnects with another upstream node Nn, the respective nodes Nn select a single node Nn (i.e. new upstream node) as a reconnection destination among nodes Nn memorizing the above-mentioned connection destination candidate information, carries out a reconnection process, and reconnects to the new upstream node Nn.

The node Nn thus reconnected (the node Nn changing a connection destination within the same topology) or the node Nn newly participating in the topology sends participation report message indicative of a report of participating in the topology (report on new participation or report on participation by reconnection) to the connection destination introduction server 20. It is desirable that the node Nn satisfying the specific terms (hereinafter, referred to as "representative node") represents to send the participation report message to the connection destination introduction server 20. That is, the node Nn desiring to notify the participation report sends the participation report message to the upstream node Nn, directly connected with the own (own node device), and the upstream node Nn receiving the participation report message relays (transfers) the participation report message to the upstream node Nn at further upper stream. Then the representative node Nn satisfying the specific terms, which is located for example in the hierarchy of multiple number of predetermined value (e.g. 10) repeats the relays until it receives the participation report message. Then, receiving the participation report message, the representative node Nn stores this and waits until the next report time comes, and then sends the participation report message to the connection destination introduction server 20.

In a manner similar thereto, in a case where the node Nn withdrawing from the topology sends a withdrawal report message indicative of withdrawal report from the topology (notifying withdrawal report) to the connection destination introduction server 20, it is desirable that the representative node Nn applicable to the specific terms representatively sends the withdrawal report message to the connection destination introduction server 20.

Here, the participation report message includes information such as the own network address information, the own NAT traversal attribute, and the network address information of the connected upstream node Nn.

Thus participation or withdrawal report messages are unified by the representative node Nn to be sent to the connection destination introduction server 20, thereby reducing communication amount to the connection destination introduction server 20.

In a case where respective nodes Nn periodically sends a life-or-death report message indicative of a life-or-death state (e.g. power on or off) of the own node device to the connection destination introduction server 20, it may be configured such that the representative node Nn represents to deal with the life-or-death report message similarly to the participation or withdrawal report message.

Further, the connection destination introduction server 20 receiving for example the participation report message sent from the node Nn by reconnection can detect whether or not attribute information of the reconnected node Nn changes when the participation report message is received. Provided that attribute information of the node Nn changes, to make the arbitrary node Nn know that the attribute information changes, the connection destination introduction server 20 generates a node attribute update packet which stores update information including network address information of the node Nn, in which attribute information changes, and attribute information after the change, sends this to the broadcast station 10, and the broadcast station 10 broadcasts the node attribute update packet on the topology.

Figure 6:
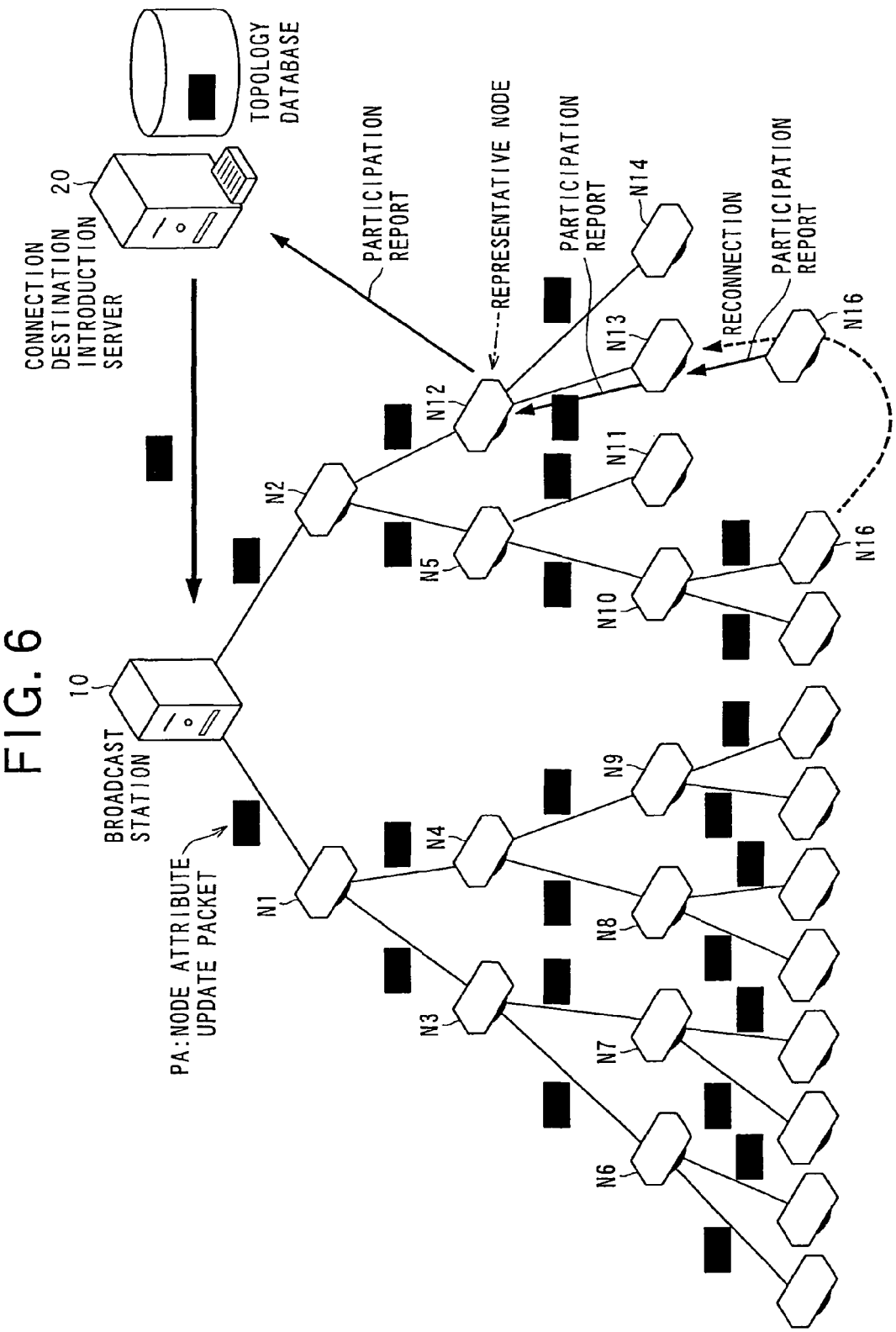
FIG. 6 is a view showing a state where node attribute updating packet PA is broadcasted from an upstream to a downstream.

FIG. 6 is a view showing a state where the node attribute update packet PA is broadcasted from an upstream to a downstream.

Thus, the node Nn receiving the node attribute update packet PA inspects whether or not the corresponding node Nn is registered in the own reconnection candidate management table, and in a case where it is registered, the attribute information of the corresponding node Nn is replaced with attribute information including the node attribute update packet PA. Accordingly, with respect to change of the attribute information of the candidate for the upstream node Nn which respective nodes Nn memorizes (caches), it is possible to adjust within a relatively short delay time.

[1-2. Configuration and the Like of Broadcast Station 10]

Next, configuration and function of the broadcast station 10 is described with reference to FIG. 7.

Figure 7:
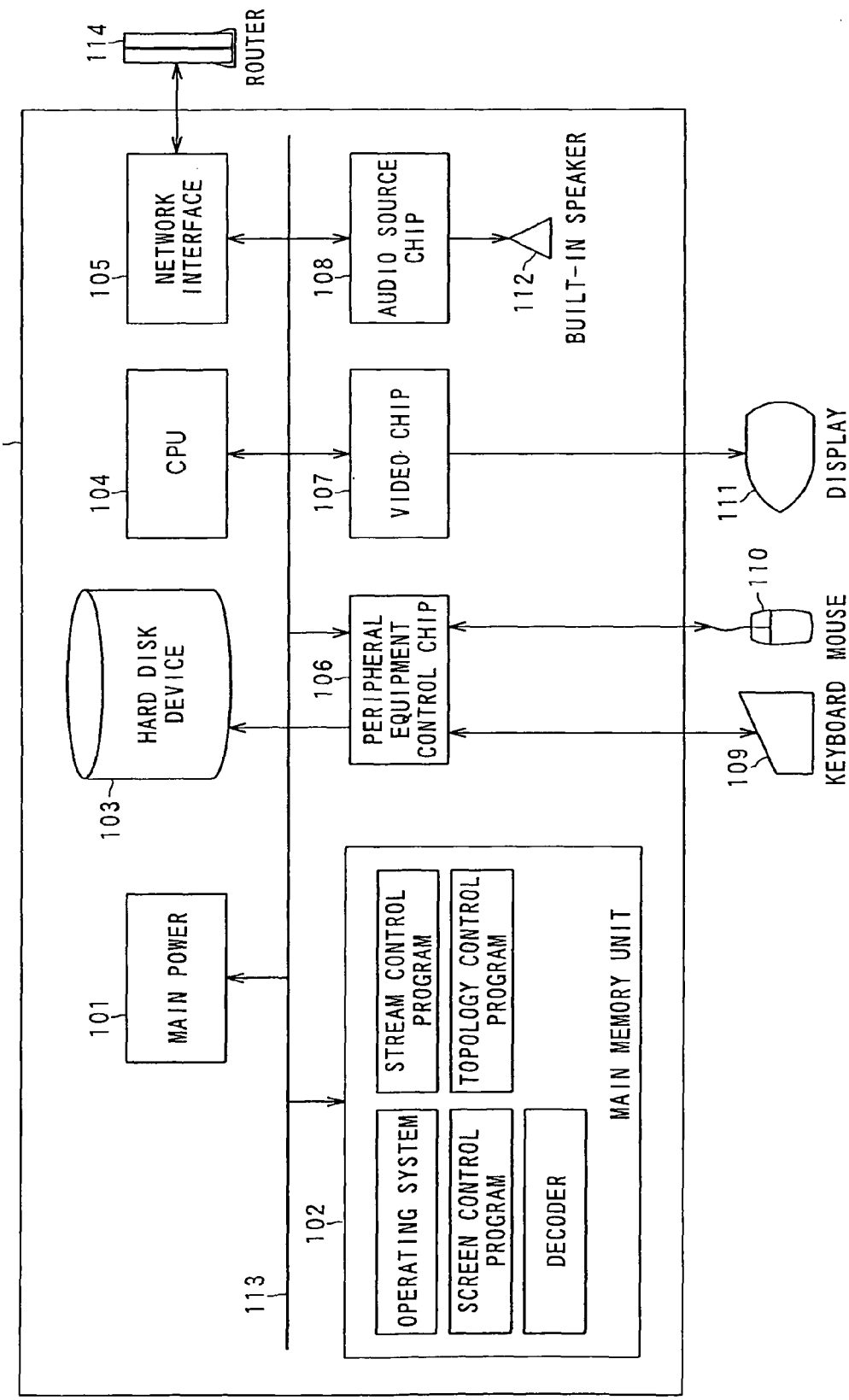
FIG. 7 is a view showing a schematic configuration example of a broadcast station 10.

FIG. 7 is a view showing an example of schematic configuration of the broadcast station 10.

As shown in FIG. 7, a broadcast station 10 includes a main power 101, a main memory unit 102, a hard disk unit 103, CPU 104, a network interface 105, a peripheral unit control chip 106, a video chip 107, an audio source chip 108, a keyboard 109, a mouse 110, a display 111, a built-in speaker 112 and the like. Meanwhile, the main power 101, the main memory unit 102, the hard disk unit 103, the CPU 104, the network interface 105, the peripheral unit control chip 106, the video chip 107, and the audio source chip 108 are mutually connected through a system bus 113. Further, the broadcast station 10 is connected to a network 8 through a router 114.

The main memory unit 102 includes RAM, ROM and the like and memorizes an operating system, a stream control program, a screen control program, a topology control program, a decoder (program) and the like. The main memory unit 102 memorizes a node management table, and the node management table is registered with information (e.g. IP address, port number and the like) of downstream nodes Nn which are connected with the broadcast station 10. Further, the main memory unit 102 has a buffer memory (e.g. ring buffer).

Further, broadcast content data and a chunk C are registered in the hard disk unit 103.

The CPU 104 carries out a broadcast process according to a variety of programs memorized in the main memory unit 102 (i.e. by executing programs). For example, content data memorized in the hard disk unit 103 is packetized and broadcasted (streamed) to downstream nodes Nn registered in the node management table. Further, the CPU 104 carries out a receiving process of a broadcast instruction message (broadcast instruction information) indicative of an instruction to broadcast a chunk C including connection destination candidate information and the connection destination candidate information which are periodically sent from the connection destination introduction server 20 and carries out a memory process of memorizing into the main memory unit 102 of the chunk C.

Then, the CPU 104 carries out a broadcast process where, for example, thus memorized chunk C is periodically read out and connection destination candidate information included in this is divided into plural pieces, and the connection destination candidate packet P is broadcasted to the downstream node Nn registered in the node management table.

Here, the number of nodes Nn to be a candidate of the reconnection destination in a single connection destination candidate packet P may be arbitrarily set up. For example, provided the number of nodes Nn to be reconnection destination candidates in a single connection destination candidate packet P is set up to be 3, and the number of nodes Nn to be reconnection destination candidates in a single chunk C is 24, the connection destination candidate information is divided into 8 as shown in FIG. 3, and they are broadcasted at respective connection destination candidate packet P (No. 1 to No. 8).

Further, the CPU 104 carries out a receiving process of the node attribute update packet PA sent from the connection destination introduction server 20 and a broadcast process of broadcasting the node attribute update packet PA to the downstream node Nn.

As such a broadcast station 10, any node Nn may be applicable besides exclusive broadcast servers.

[1-3. Configuration and the Like of Connection Destination Introduction Server 20]

Figure 8:
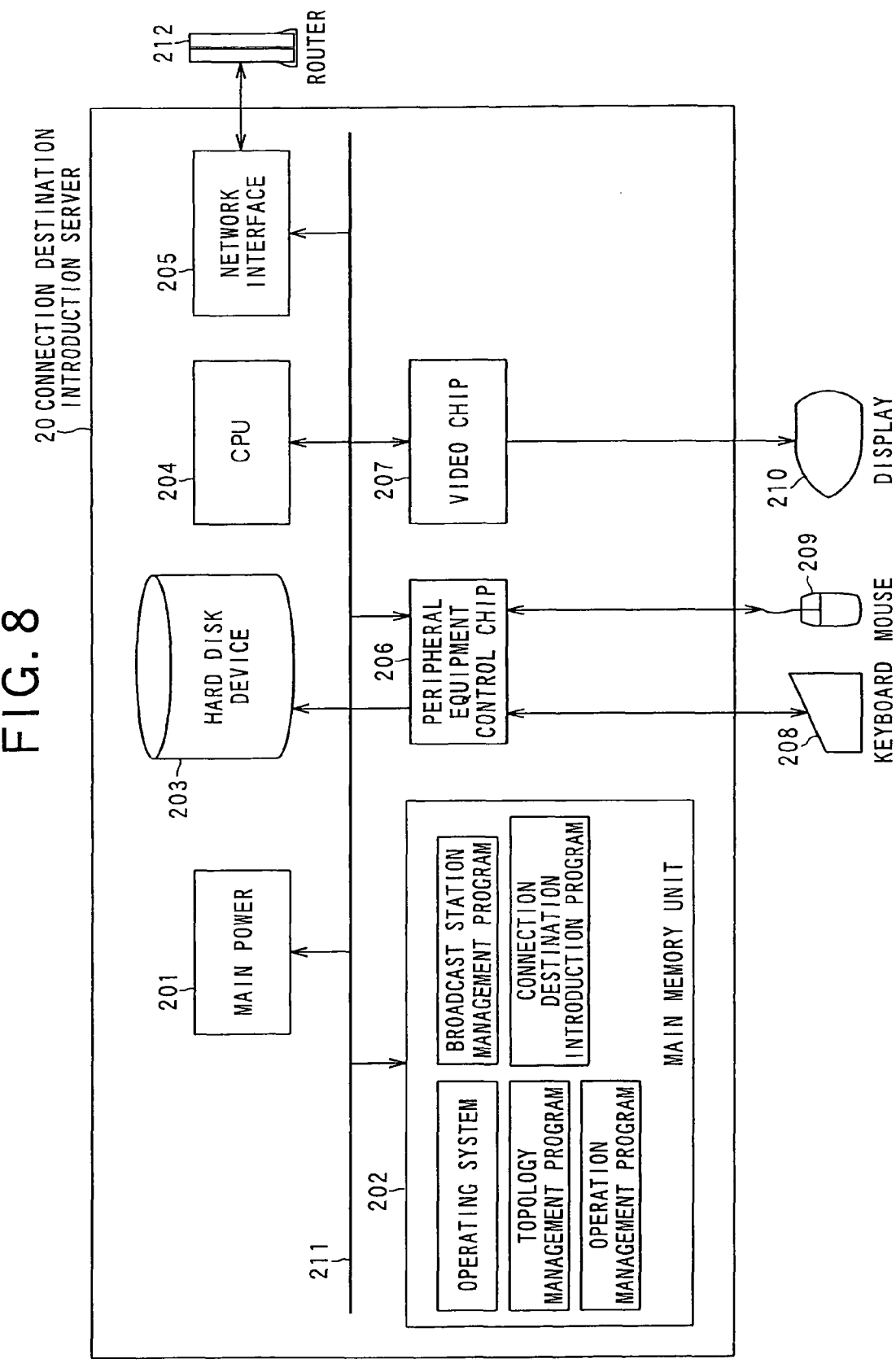
FIG. 8 is a view showing a schematic configuration example of a connection destination introduction server 20.

Next, with reference to FIG. 8, a configuration and a function of a connection destination introduction server 20 are explained.

FIG. 8 is a view showing a schematic configuration example of the connection destination introduction server 20.

As shown in FIG. 8, a connection destination introduction server 20 includes a main power 201, a main memory unit 202, a hard disk unit 203, CPU 204 as examples of a connection destination candidate information generation means, a connection destination candidate information sending means, a report information receiving means, and an update means, a network interface 205, a peripheral unit control chip 206, a video chip 207, a keyboard 208, a mouse 209, a display 210 and the like. Further, the main power 201, the main memory unit 202, the hard disk unit 203, the CPU 204, the network interface 205, the peripheral unit control chip 206, and the video chip 207 are mutually connected through a system bus 211. Further, the connection destination introduction server 20 is connected to the network 8 through a router 212.

The main memory unit 202 includes RAM, ROM and the like, and memories server process program such as an operating system, a broadcast station management program, a topology management program, a connection destination introduction program, an a operation management program.

Further, the hard disk unit 203 is provided with a broadcast station management database and a topology database. Location information of respective broadcast stations 10 (e.g. IP address, port number and the like) is registered in the broadcast station management database in correspondence with broadcast channel information (e.g. channel number). Further, topology management information (an example of information indicative of connection mode) is registered in the topology database. The topology management information exists in every broadcast channel and corresponds with broadcast channel information. The topology management information includes network address information (e.g. IP address and port number) of respective nodes Nn participating in topology, NAT traversal attribute, the number of downstream connections, information indicative of downstream node (e.g. node ID) currently connected, the connection allowable number (e.g. 2) of downstream nodes, transfer capacity, and hierarchy level value. Here, the transfer capacity means, for example, CPU processing speed (GHz) of the node Nn and effective bandwidth (e.g. data transfer speed (bps)) in the network 8.

According to various programs memorized in the main memory unit 202, the CPU 204 searches a downstream connection possible node Nn from the above-mentioned topology management information in response to a connection destination introduction request from a node Nn which is desired newly to participate in the topology. Then the main memory unit 202 carries out an introduction process of introducing one or more upstream node candidates thus searched, as a connection destination.

Further, the CPU 204 carries out a sending process, for example periodically, wherein a plurality of the latest downstream connection possible nodes Nn are extracted as reconnection destination candidates based on the topology management information, the above-mentioned connection destination candidate information is generated, and the chunk C including this and the broadcast instruction message indicative of a broadcast instruction by the connection destination candidate information are sent to the broadcast station 10. The number of the nodes Nn to be a reconnection destination candidate which can be included in a single chunk C may be arbitrarily set up. Here, in a case where the number of the latest downstream connection possible nodes Nn is larger than that of nodes Nn which can be included in a single chunk C, a priority is given to, for example, nodes Nn having a larger transfer capacity and nodes Nn having the smaller number of downstream connections, and they are specified as a node Nn to be a reconnection destination candidate.

Further, in a case where a participation report message, a withdrawal report message, or a life-or-death report message is received from the node Nn, the CPU 204 carries out an update process of updating the topology management information based on the message.

Further, as mentioned above, the CPU 204 carries out a detect process of detecting whether or not attribute information of the reconnected node Nn changes (e.g. changes of the number of downstream connections and hierarchy level value). Then in a case where the attribute information of the node Nn changes, the CPU 204 generates a node attribute update packet PA where update information includes network address information of the node Nn having attribute information which is changed and attribute information after change, and sends this to the broadcast station 10.

[1-4. Configuration and the Like of Node Nn]

Figure 9:
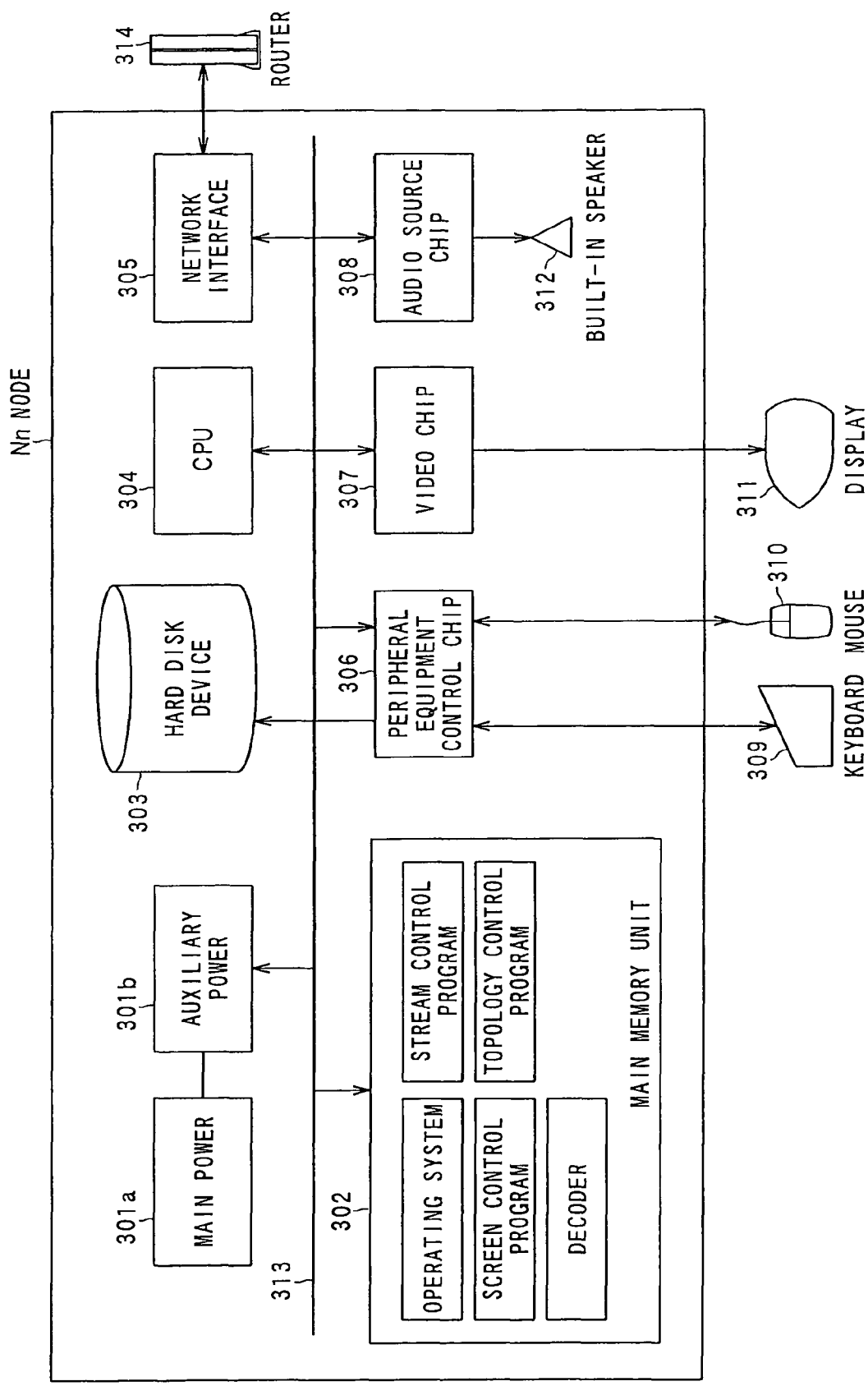
FIG. 9 is a view showing a schematic configuration example of a node Nn.

Next, with reference to FIG. 9, a configuration and a function of node Nn is explained.

FIG. 9 is a view showing a schematic configuration example of node Nn.

As sown in FIG. 9, a node Nn includes a main power 301a, an auxiliary power 301b, a main memory unit 302 as an example of a reconnection destination candidate memory means, a connection destination candidate store means, and a report information store means, a hard disk unit 303, CPU 304 as an example of a connection destination candidate information receiving means, a reconnection destination candidate specifying means, a connection processing means, a connection destination candidate information transfer means, an allowance number judge means, an update information receiving means, an attribute information update means, a report information receiving means, and a report information sending means, a network interface 305, a peripheral unit control chip 306, a video chip 307, a sound source chip 308, a keyboard 309, a mouse 310, a display 311, and built-in speaker 312 and the like are mutually connected through a system bus 313. Further, the node Nn is connected to the network 8 through the router 314.

Meanwhile, PC, STB (Set Top Box), or a TV receiver or the like is applicable as a node Nn.

The main memory unit 302 includes RAM, ROM, and the like and memorizes an operating system, a screen control program, a stream control program, a topology control program, and a node processing program such as a decoder.

Further, the main memory unit 302 has a buffer memory (e.g. ring buffer) for temporarily storing the received content data. Further, the main memory unit 302 memorizes a node management table and a connection candidate management table. In the node management table, information (IP address, port number, and the like) of downstream node connected to the own node device are registered. In the connection candidate management table, connection destination candidate information and the like are registered, which are related to the reconnection destination candidate specified from connection destination candidate information included in the connection destination candidate packet P by a reconnection specifying process described later.

FIG. 10 is an example of connection destination candidate information registered in a connection candidate management table.

In the example of FIG. 10, in the connection candidate management table, a global IP address, a local IP address, NAT traversal attribute, the number of downstream connections, and a hierarchy level value, and further date and time as cache time of these information (hereinafter simply referred to as "registration time") are registered in correspondence with each other, with respect to every reconnection candidate specified by the reconnection specifying process. Due to this, registration in correspondence with registration time, newness of registered information can be judged.

Here, in the NAT traversal attribute as shown in FIG. 10, "TCP Client" is the NAT traversal attribute provided in a case where a router connected with a corresponding reconnection candidate node is not corresponding to UPnP and UDP Hole Punching cannot be carried out. In a case where such the node is connected as an upstream node, connection is established in such manner that the upstream node is TCP-connected to a waiting port of the own node device in use of a relay server having been established. Further, in the NAT traversal attribute shown in FIG. 10, "UPnP+TCP" employs UPnP as an NAT traversal art and the NAT compatible router for connecting to the network 8 has a function to relay only packets based on TCP. On the other hand, "UPnP+UDP" employs UPnP as an NAT traversal art and the NAT compatible router for connecting to the network 8 has a function to relay only packets based on UDP.

Further, the main memory unit 30 memorizes attribute information including the NAT traversal attribute of the own node device, the number of downstream connections, and the hierarchy level value (e.g. acquiring from the connection destination introduction server 20 or the upstream node).

Here, in the main memory unit 302 of the representative node Nn, a memory area for unifying messages for temporarily storing a participation report message, a withdrawal report massage, or a life-or-death report message, which is received from the downstream node Nn, is secured. Further in the main memory unit 302 of the downstream connection possible node Nn having remaining capacity with respect to the number of downstream connections, a memory area for storing connection destination candidate packets, which temporarily stores the connection destination candidate packet P received from the upstream node Nn, is secured.

Further, according to various programs memorized in the main memory unit 302, the CPU 304 carries out a participation process of participating in a tree-type broadcast system S (topology related to a certain broadcast channel), and after the participation, the CPU 304 buffers a packet of content data (content stream) which are broadcasted from the broadcast station 10 or the upstream node Nn and received through the network interface 305 to carry out a reproduction process.

Here, in the above participation process, a connection destination introduction request is made to the connection destination introduction server 20, and a stream start request is made by connecting (establishing session) to the upstream node Nn introduced from the connection destination introduction server 20. Further, in the reproduction process, the content data (e.g. video data and audio data) stored in the received buffer memory are read out and decoded by the decoder. Then, thus decoded video data (image information) are outputted on the display 311 through the video chip 307, and thus decoded audio data (audio information) are outputted from the built-in speaker 312 (or an external speaker not shown) through the sound source chip 308.

Further, in a case where the downstream node Nn is connected to the own node device, a transfer process is carried out of transferring (relaying content stream) respective packets of the content data stored in the buffer memory to the downstream node Nn.

Further, the CPU 304 carries out a reconnection specifying process of specifying the node Nn matching the own node device attribute information as a reconnection destination candidate of the own node device, among plural nodes Nn indicated in the connection destination candidate information included in the connection destination candidate packet P received through network interface 305 broadcasted from the broadcast station 10 or the upstream node Nn. Then the connection destination candidate information related to thus specified node Nn is registered in the connection candidate management table.

For example, the CPU 304 extracts the reconnection destination candidates by the number of the delivery nodes from the connection destination candidate information with reference to the number of delivery nodes of the application layer header in the connection destination candidate packet P. At this time, the CPU 304 examines appropriateness of attribute information, and excludes the node Nn which is not adaptable to attribute information of the own node device, from the reconnection destination candidates thus extracted.

For example, among nodes Nn indicated in the connection destination candidate information, the CPU 304 excludes the node Nn which are not applicable to the own NAT traversal attribute as a reconnection destination candidate not applicable to the own node device attribute information, based on (compared with) NAT traversal attribute of the node Nn indicated in NAT traversal attribute and the connection destination candidate information of the own node device. This is because it is difficult to generate peer-to-peer connection (to establish connection) unless NAT traversal appropriateness is satisfied.

Further, for example, among nodes Nn indicated in the connection destination candidate information, the CPU 304 excludes the node Nn which is located at a lower hierarchy than the own node device, that is, has a larger hierarchy level value than the own node device as a reconnection destination candidate not applicable to the own attribute information, based on (compared with) hierarchy level value of the node Nn indicated in a hierarchy level value and a connection destination candidate information of the own node device. This is because, in a case where a node Nn having larger hierarchy level value than the own node device is set as a specifiable subject, there is a possibility of specifying the downstream node Nn which can follow from the own node device to downstream, and assumed that such downstream node Nn is considered to be the upstream node Nn and connected, there is a problem that a delivery route is circulated.

Here it may be constituted such that either one of the appropriateness of NAT traversal attribute and the appropriateness of hierarchy level value is examined. However, it is preferable to specify a node Nn which satisfies the appropriateness of NAT traversal attribute and the appropriateness of hierarchy level value, as a reconnection candidate. Further, it may be possible to examine based on appropriateness of other attribute information than NAT traversal attribute and hierarchy level value.

Meanwhile, the connection destination candidate information of the node Nn to be a reconnection destination candidate extracted by the connection destination introduction server 20 is equally delivered to the all nodes Nn participating in the topology. However, in a case where specific reconnection destination candidates indicated in the connection destination candidate information are only specified by many nodes Nn and multiple reconnections occur simultaneously, it occurs that connection requests are concentrated to the node Nn thus specified. In order to avoid such occurrence, it is desirable to disperse reconnection candidates in the topology, when respective nodes Nn specify reconnection destination candidates from connection destination candidate information included in the connection destination candidate packet P. There are particular examples that the number of reconnection destination candidates specified by a single connection destination candidate packet P is restricted (restricted by the number of delivery nodes) and probability (randomness) is introduced to this reconnection specifying process.

Figure 11:
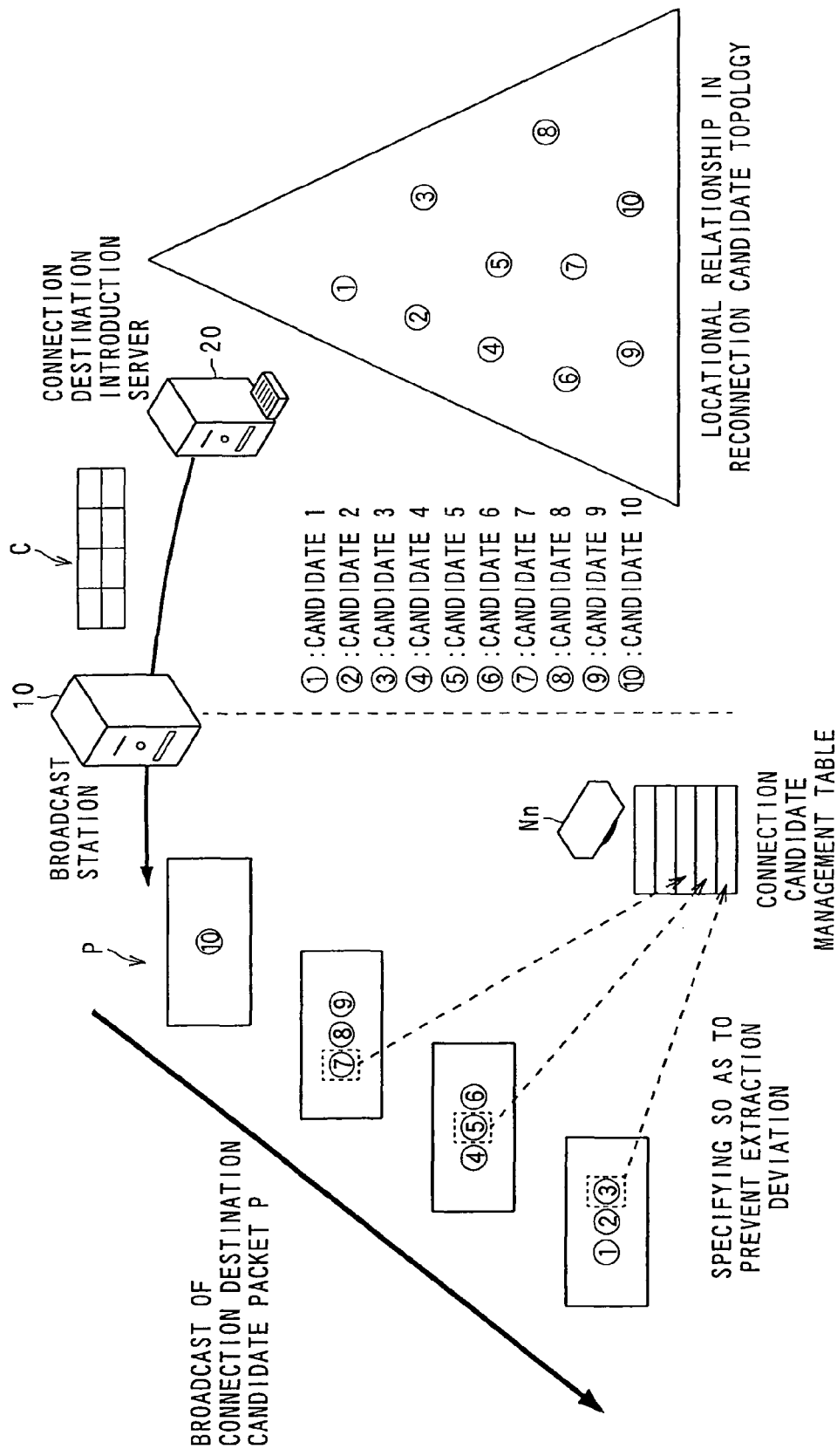
FIG. 11 is a view showing an example of specifying so that the reconnection candidate is scattered in a vertical direction in a topology.

FIG. 11 is a view showing an example of specifying so that the reconnection candidates are scattered in a vertical direction in the topology. In a case where the node Nn receiving the connection destination candidate packet P examines appropriateness of the hierarchy level value as mentioned above, it specifies only the reconnection destination candidates having higher hierarchy level value than the own. Therefore, the reconnection destination candidates thus specified are not deviated in the vertical direction in the topology as shown in "location relation in the reconnection candidate topology" in FIG. 11.

Meanwhile, in a case where the received connection destination candidate packet P is temporarily stored in the buffer memory and the downstream node Nn is connected to the own node device, the CPU 304 carries out a transfer process of transferring the connection destination candidate packet P thus stored in the buffer memory to the downstream node Nn. At this time, the CPU 304 carries out a judgment process of judging whether or not the number of downstream nodes Nn currently connected to the own node device reaches the connection allowable number of the own node device. In a case where it is judged that the CPU 304 does not reach the connection allowable number, the CPU 304 transfers the connection destination candidate packet P from the above buffer memory to the memory area for storing the connection destination candidate packet in the main memory unit 302 and stores it for a predetermined time period, in order to transfer the connection destination candidate packet P to the node Nn directly connected to downstream after then. Then, in a case where a new node Nn is connected as a downstream node during storing period as shown in FIG. 5, the CPU 304 carries out a transfer process of transferring the connection destination candidate packet P thus stored to the downstream node Nn. Accordingly, the node Nn newly participating in the topology can immediately acquire the connection destination candidate information.

Then, in a case where connection with the upstream node Nn or the broadcast station 10 which the own currently connects with is released and newly reconnected to another upstream node Nn when an autonomous reconnection event occurs, the CPU 304 selects one node Nn as reconnection destination among nodes Nn registered in the connection candidate management table (e.g. selecting randomly or selecting by giving priority to a node Nn having registration time closest to the present time), and carries out a reconnection process of connecting it to the upstream node Nn based on network address information of the upstream node Nn thus selected as reconnection destination. Such the reconnection process is carries out according to the procedures of (3) to (6) as shown in FIG. 2.

Further, the CPU 304 carries out a delete process of deleting the connection destination candidate information which is a certain period old before the past (obsolete) with reference to registration time in the connection candidate management table at constant intervals. Accordingly, fresh connection destination candidate information are always retained in the connection candidate management table, and probability of connection failure can be reduced in the aspect where the node Nn utilizes the connection destination candidate information in the reconnection process in the connection candidate management table.

Further, the CPU 304 carries out a judgment process of judging whether or not the own node device is the representative node Nn sending the report information to the connection destination introduction server 20 as a representative. The judgment is whether or not the own node device meets the specific terms (for example, whether or not the own node device is located in the hierarchy which is multiple number of predetermined value (e.g. 10)). In a case where the own node device is a representative node Nn, when the participation report message (including participation by reconnection) from the downstream node Nn directly connected to the own node device, the withdrawal report message, or the life-or-death report message is received, the CPU 304 temporarily stores the report messages (the participation report message, the withdrawal report message, or the life-or-death report message) in the memory area for unifying messages in the main memory unit 302, and sends the report messages thus stored at every predetermined period to the connection destination introduction server 20. At this time, the above report messages related to the own node device are also sent to the connection destination introduction server 20.

On the other hand, in a case where the own node device is not the representative node Nn, when the participation report message from the downstream node Nn directly connected to the own node device, the withdrawal report message, or the life-or-death report message is received, the CPU 304 carries out a sending process of sending (transferring) thus received report messages to the upper node Nn directly connected with the own node device. At this time, the report messages related to the own node device are also sent to the upper node Nn.

Further, the CPU 304 carries out an update process of updating the attribute information registered in the connection candidate management table based on the attribute information after change, which is included in the update information in the node attribute update packet PA received through the network interface 305 broadcasted from the broadcast station 10 or the upstream node Nn. For example, in a case where the number of downstream connections or the hierarchy level value after change is included in the update information, the number of downstream connections or the hierarchy level value which is registered in the connection candidate management table is replaced with the number of downstream connections or the hierarchy level value which is included in the above-mentioned update information.

[2. Operation of Tree-Type Broadcast System S]

Next, an operation of a tree-type broadcast system S related to the present embodiment is explained.

(Process of Node Nn)

First, with reference to FIGS. 12 to 16, a process of the CPU 304 is explained in the node Nn.

FIGS. 12 to 16 are flowcharts showing a process carried out by the CPU 304 in the node Nn.

Figure 12:
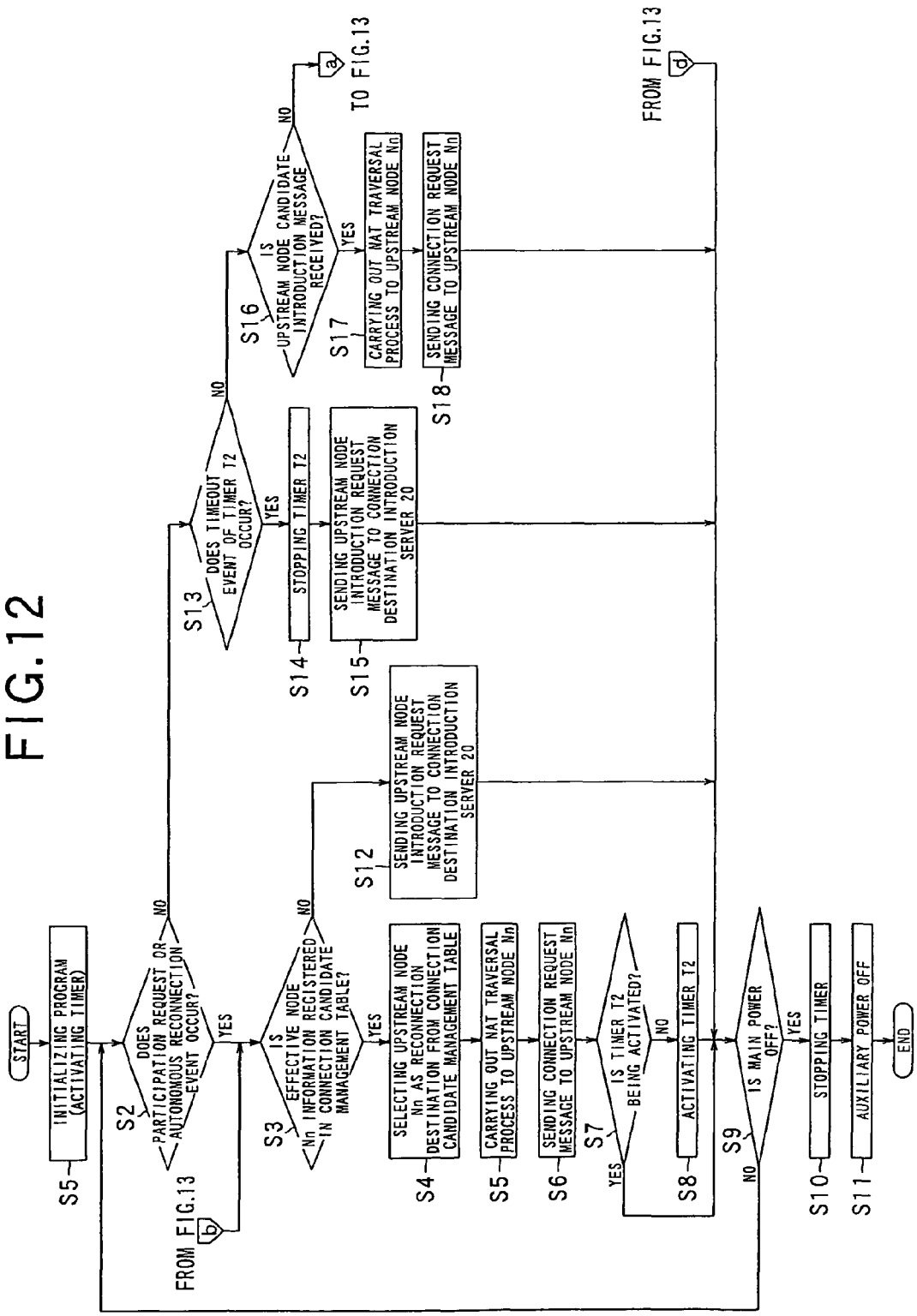
FIG. 12 is a flowchart of a process carried out by CPU 304 in the node Nn.

A process of FIG. 12 starts by activating the node Nn by for example power-on of a main power 301a and an auxiliary power 301b. When the process starts, in Step S1, various types of programs in the node Nn are initialized and timers for various cycle processes start when a time-out event occurs.

In Step S2, it is judged whether or not participation is requested through a keyboard 309 or a mouse 310 or whether or not the above-mentioned autonomous reconnection event occurs. Then in a case where participation is requested by a user or whether the autonomous reconnection event occurs (Step S2: YES), the process goes to Step S3. In a case where participation is not requested by the user or whether the autonomous reconnection event does not occur (Step S2: NO), the process goes to Step S13.

In Step S3, it is judged whether or not connection destination candidate information of the effective node Nn is registered in the above-mentioned connection candidate management table. Then, in a case where the connection destination candidate information of the effective node Nn is registered (Step S3: YES), the process goes to Step S4. In a case where the connection destination candidate information of the effective node Nn is not registered (Step S3: NO), the process goes to Step S12.

In Step S4, an upstream node Nn one level upper from the connection candidate management table is selected as a reconnection destination for example randomly, and network address information of the upstream node Nn is acquired.

In Step S5, a connection process of connecting to the upstream node Nn thus selected (a new connection process or a reconnection process) starts, and first an NAT traversal process (process of passing a packet from WAN side network of a router to LAN side network) is carried out with respect to the upstream node Nn.

In Step S6, a connection request message is sent to the upstream node Nn thus selected. In a case where a connection refusal response message in response to this connection request message is received from the upstream node Nn in Step S26 described later, in a case where connection candidate management table use timer T2 is activated, the processes of the above Steps S3 to S6 are repeated again, and the connection request message is sent to another upstream node Nn registered in the connection candidate management table.

In Step S7, it is judged whether or not the connection candidate management table use timer T2 is activated. In a case where the connection candidate management table use timer T2 is activated (Step S7: YES), the process goes to Step S9. In a case where the connection candidate management table use timer T2 is not activated (Step S7: NO), the process goes to Step S8 to activate the timer T2 and then goes to Step S9. Here, the connection candidate management table use timer T2 is purposed to provide upper-limit time for the connection process using the connection candidate management table.

In Step S9, it is judged whether or not the main power 301a of the node Nn is off. In a case where the main power 301a is off (Step S9: YES), the process goes to Step S10. In a case where the main power 301a is not off (Step S9: NO), the process returns to Step S2.

In Step S10, when the main power 301a becomes off, various programs are finished, and the timers for various cycle process stop. Then the auxiliary power 301b is off (Step S11), and the process is finished.

In Step S12, an upstream node introduction request message is sent to a connection destination introduction server 20.

In Step S13, it is judged whether or not the timeout event of the connection candidate management table use timer T2 occurs. In a case where the timeout event of the timer T2 occurs (Step S13: YES), the process goes to Step S14. In a case where the timeout event of the timer T2 does not occur (Step S14: NO), the process goes to Step S16.

In Step S14, the connection candidate management table use timer T2 stops.

In Step S15, the upstream node introduction request message is sent to the connection destination introduction server 20. In other words, when the upstream node Nn is connected to, priority is given to the connection candidate management table to be used, and after a lapse of certain period (after occurrence of the timeout event of the timer T2) the connection destination introduction server 20 is used (Step S28).

In Step S16, it is judged whether or not the upstream node candidate introduction message is received from the connection destination introduction server 20. In a case where the upstream node candidate introduction message is received (Step S16: YES), the process goes to Step S17. In a case where the upstream node candidate introduction message is not received (Step S16: NO), the process goes to Step S19 shown in FIG. 13. The upstream node candidate introduction message includes network address information of the upstream node Nn (or the broadcast station 10 in some cases) searched by the connection destination introduction server 20.

In Step S17, an NAT traversal process is carried out with respect to the upstream node Nn indicated in thus received upstream node candidate introduction message.

In Step S18, the connection request message is sent to the upstream node Nn thus indicated in the upstream node candidate introduction message.

Figure 13:
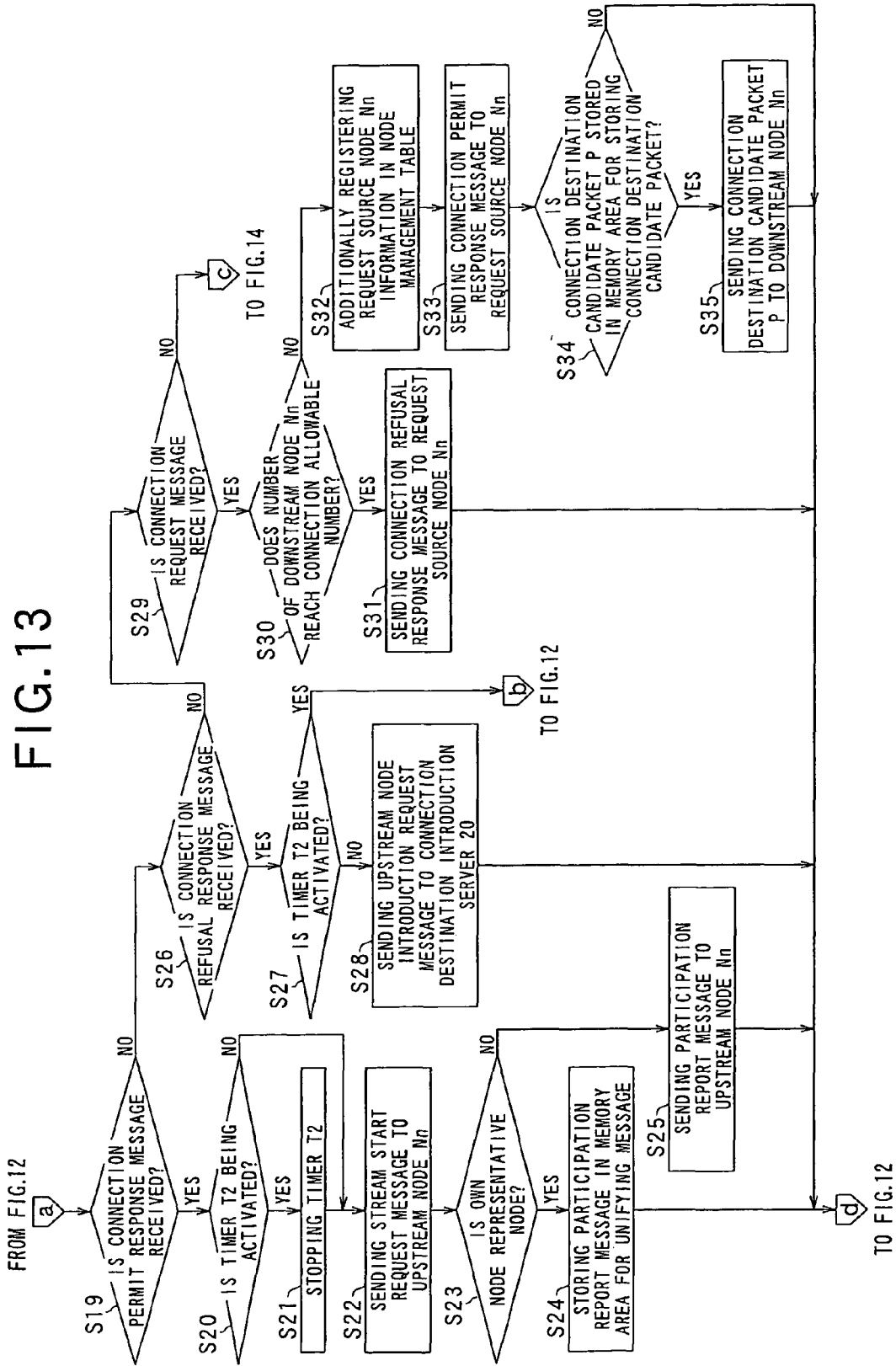
FIG. 13 is a flowchart of a process carried out by CPU 304 in the node Nn.

In Step S19 shown in FIG. 13, it is judged whether or not a connection permit response message is received from the upstream node Nn. In a case where the connection permit response message is received (Step S19: YES), the process goes to Step S20. In a case where the connection permit response message is not received (Step S19: NO), the process goes to Step S26.

In Step S20, it is judged whether or not the connection candidate management table use timer T2 is activated. In a case where the connection candidate management table use timer T2 is activated (Step S20: YES), the timer T2 stops (Step S21), and the process goes to Step S22. In a case where the connection candidate management table use timer T2 is not activated (Step S20: NO), the process goes to Step S22.

In Step S22, a stream start request message is sent to the upstream node Nn sending the connection permit response message. Accordingly, the own node device participates in a topology.

In Step S23, it is judged whether or not the own node device is a representative node unifying messages. For example, a hierarchy level value of the own node device is referred to thereby judge whether or not the own node device is located in a hierarchy of multiple number of the predetermined value (e.g. 10). In a case where the own node device is the representative node (Step S23: YES), the process goes to Step S24. In a case where the own node device is not the representative node (Step S23: NO), the process goes to Step S25.

In Step S24, an own node device topology participation report message is stored in a memory area for unifying messages.

In Step S25, the own node device topology participation report message is sent to the upstream node Nn connected with the own node device.

In Step S26, it is judged whether or not a connection refusal response message is received from the upstream node Nn. In a case where the connection refusal response message is received (Step S26: YES), the process goes to Step S27. In a case where the connection refusal response message is not received (Step S26: NO), the process goes to Step S29.

In Step S27, it is judged whether or not the connection candidate management table use timer T2 is activated. In a case where the connection candidate management table use timer T2 is activated (Step S27: YES), the process returns to Step S3 shown in FIG. 12. In a case where the connection candidate management table use timer T2 is not activated (Step S27: NO), the process goes to Step S28.

In Step S28, an upstream node introduction request message is sent to the connection destination introduction server 20.

In Step S29, it is judged whether or not a connection request message is received from another node Nn. In a case where the connection request message is received (Step S29: YES), the process goes to Step S30. In a case where the connection request message is not received (Step S29: NO), the process goes to Step S36 shown in FIG. 14.

In Step S30, it is judged whether or not the number of downstream nodes Nn connected to the own node device reaches the connection allowable number of the own node device. In a case where the number of downstream nodes Nn reaches the connection allowable number of the own node device (Step S30: YES), the process goes to Step S31. In a case where the number of downstream nodes Nn does not reach the connection allowable number of the own node device (Step S30: NO), the process goes to Step S32.

In Step S31, the connection refusal response message is sent to the node Nn sending the connection request message.

In Step S32, information of the node Nn sending the connection request message is additionally registered in the node management table.

In Step S33, a connection permit response message is sent to the node Nn sending the connection request message. Accordingly, the node Nn sending the connection request message becomes a new downstream node Nn connected to the own node device.

In Step S34, it is judged whether or not a connection destination candidate packet P is stored in the memory area for storing the connection destination candidate packet. In a case where the connection destination candidate packet P is stored (Step S34: YES), the process goes to Step S35. In a case where the connection destination candidate packet P is not stored (Step S34: NO), the process returns to Step S9 shown in FIG. 12.

In Step S35, all connection destination candidate packets P thus stored are sent to a newly connected downstream node Nn.

Figure 14:
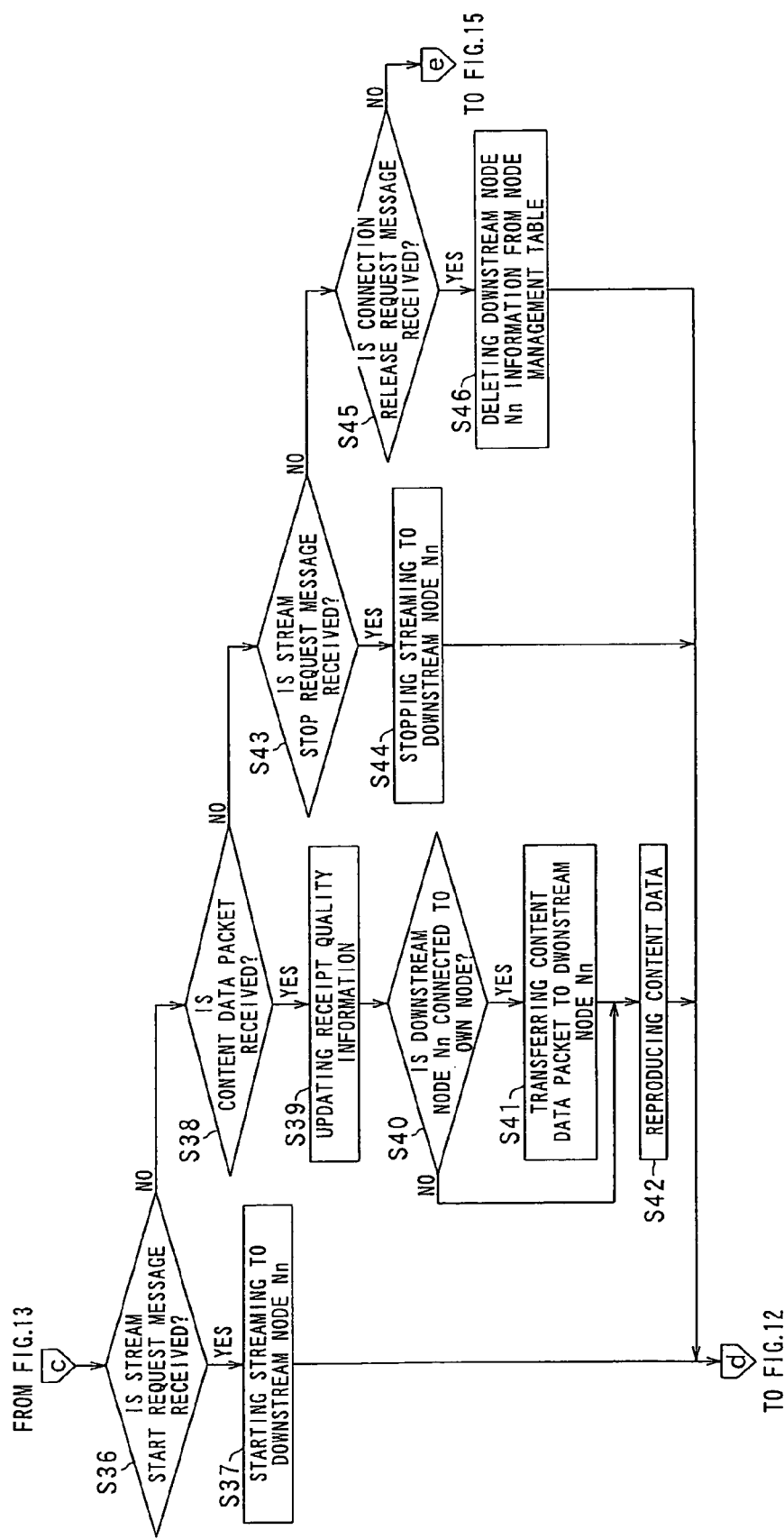
FIG. 14 is a flowchart of a process carried out by CPU 304 in the node Nn.

Next, in Step S36 shown in FIG. 14, it is judged whether or not a stream start request message is received from the downstream node Nn. In a case where the stream start request message is received (Step S36: YES), the process goes to Step S37. In a case where the stream start request message is not received (Step S36: NO), the process goes to Step S38.

In Step S37, transfer (relay) of the content data packet starts (starts streaming) with respect to the downstream node Nn sending the stream start request message.

In Step S38, it is judged whether or not the content data packet is received from the upstream node Nn. In a case where the content data packet is received (Step S38: YES), the process goes to Step S39. In a case where the content data packet is not received (Step S38: NO), the process goes to Step S43.

In Step S39, receipt quality information managed for example in the main memory unit 302 is updated. For example, the CPU 304 calculates an average packet rate of past one year, an average packet loss rate, packet arrival fluctuation, and the like as receipt quality information and updates receipt quality information calculated and memorized in the past.

In Step S40, it is judged whether or not the downstream node Nn is connected to the own node device. In a case where the downstream node Nn is connected to the own node device (Step S40: YES), thus received content data packet is transferred (relayed) to the downstream node Nn (Step S41), and the process goes to Step S42. In a case where the downstream node Nn is not connected to the own node device (Step S40: NO), the process goes to Step S42.

In Step S42, the content data is reproduced. That is, the content data thus received and stored in the buffer memory are read out and are reproduced through a display 311, a built-in speaker 312 and the like.

In Step S43, it is judged whether or not a stream stop request message from the downstream node Nn is received. In a case where the stream stop request message is received (Step S43: YES), the process goes to Step S44. In a case where the stream stop request message is not received (Step S43: NO), the process goes to Step S45.

In Step S44, transfer of content data packet to the downstream node Nn is stopped (streaming being stopped).

In Step S45, it is judged whether or not a connection release request message from the downstream node Nn is received. In a case where the connection release request message is received (Step S45: YES), the process goes to Step S46. In a case where the connection release request message is not received (Step S45: NO), the process goes to Step S47 shown in FIG. 15.

In Step S46, information of the downstream node Nn sending the connection release request message is deleted from the node management table.

Figure 15:
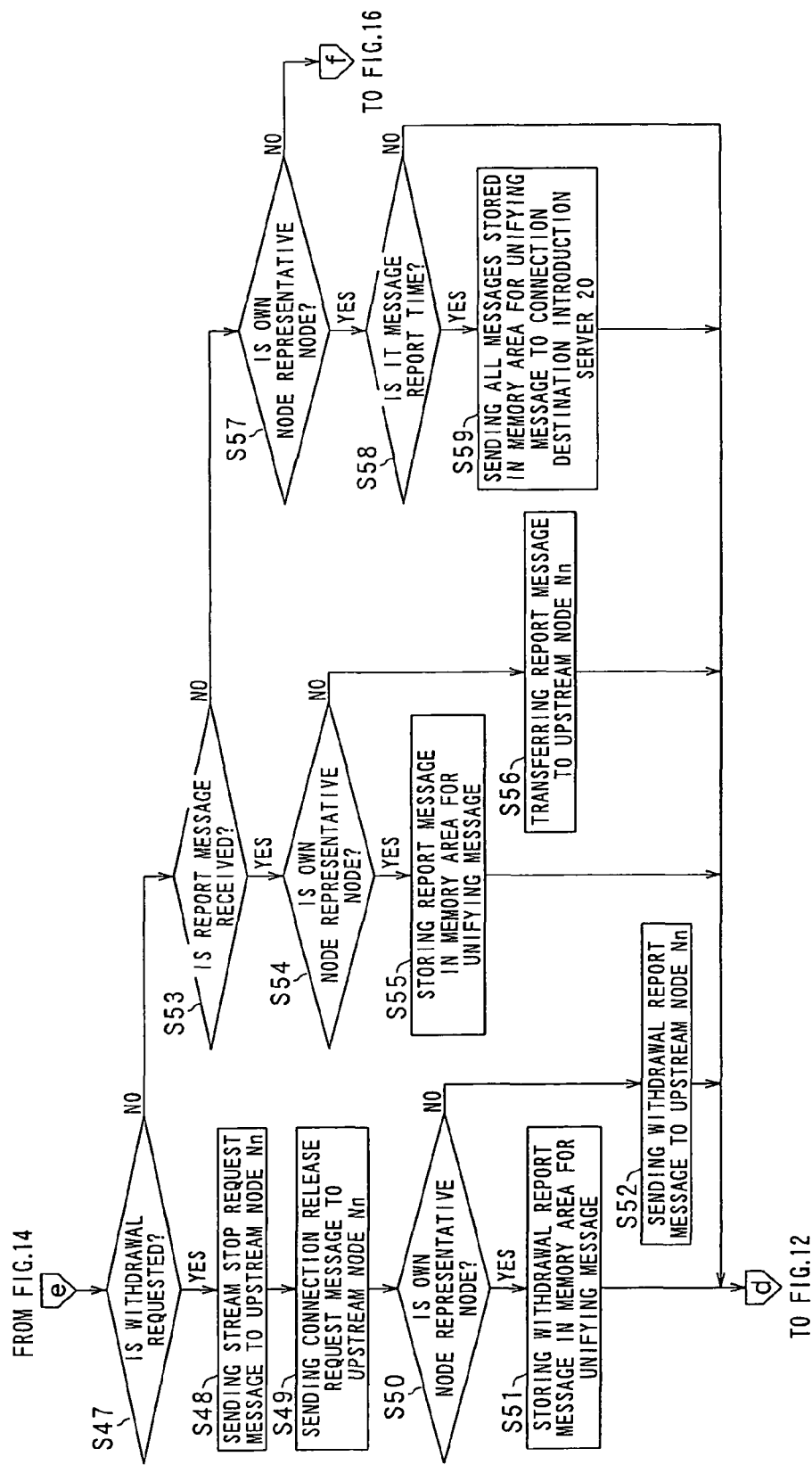
FIG. 15 is a flowchart of a process carried out by CPU 304 in the node Nn.

Next, in Step S47 shown in FIG. 15, it is judged whether or not a withdrawal request is made by a user through the keyboard 309 or the mouse 310. In a case where the withdrawal request is made by the user (Step S47: YES), the process goes to Step S48. In a case where the withdrawal request is not made by the user (Step S47: NO), the process goes to Step S53.

In Step S48, the stream stop request message is sent to the upstream node Nn.

In Step S49, the connection release request message is sent to the upstream node Nn. Accordingly, the own node device withdraws from the topology.

In Step S50, it is judged whether or not the own node device is a representative node unifying messages. In a case where the own node device is the representative node (Step S50: YES), the process goes to Step S51. In a case where the own node device is not the representative node (Step S50: NO), the process goes to Step S52.

In Step S51, an own node device topology withdrawal report message is stored in the memory area for unifying messages.

In Step S52, an own node device topology withdrawal report message is sent to the upstream node Nn connected to the own node device.

In Step S53, it is judged whether or not a participation report message or a withdrawal report message from the downstream node Nn is received. In a case where the participation report message or the withdrawal report message is received (Step S53: YES), the process goes to Step S54. In a case where the participation report message and the withdrawal report message are not received (Step S53: NO), the process goes to Step S57.

In Step S54, it is judged whether or not the own node device is a representative node unifying messages. In a case where the own node device is the representative node (Step S54: YES), the process goes to Step S55. In a case where the own node device is not the representative node (Step S54: NO), the process goes to Step S56.

In Step S55, the participation report message or the withdrawal report message thus received is stored in the memory area for unifying messages.

In Step S56, the participation report message or the withdrawal report message thus received is transferred to the upstream node Nn connected to the own node device.

In Step S57, it is judged whether or not the own node device is the representative node unifying messages. In a case where the own node device is the representative node (Step S57: YES), the process goes to Step S58. In a case where the own node device is not the representative node (Step S57: NO), the process goes to Step S60.

In Step S58, it is judged whether or not it is the reporting opportunity (report time) of messages stored in the memory area for unifying messages. In a case where it is the reporting opportunity of messages (Step S58: YES), the process goes to Step S59. In a case where it is not the reporting opportunity of messages (Step S58: NO), the process returns to Step S9 shown in FIG. 12.

In Step S59, all messages stored in the memory area for unifying messages are sent to the connection destination introduction server 20. The above reporting opportunity is set up such that the message stored in the memory area for unifying messages is sent, for example, once a minute.

Figure 16:
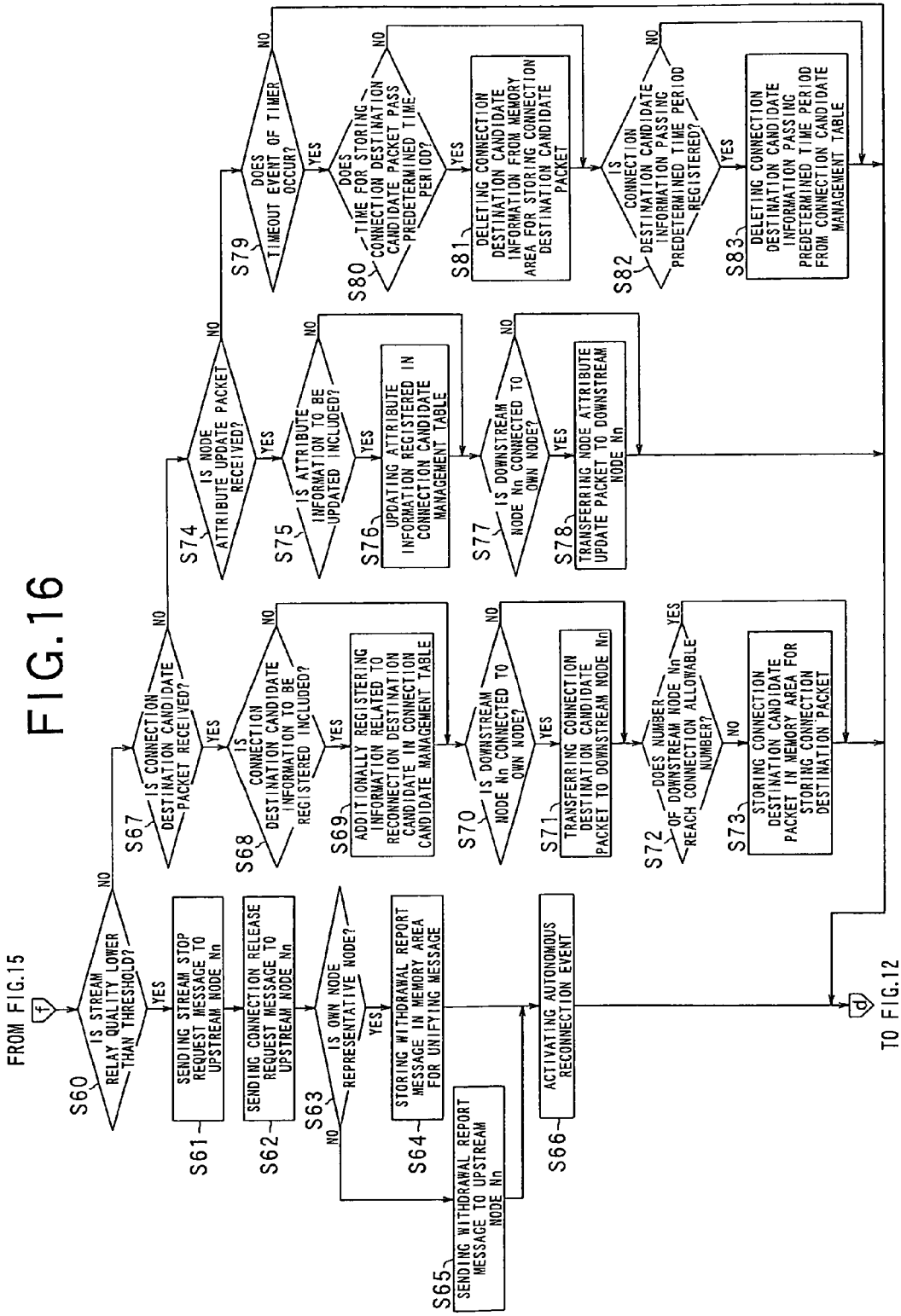
FIG. 16 is a flowchart of a process carried out by CPU 304 in the node Nn.

In Step S60 shown in FIG. 16, it is judged whether or not a stream relay quality is lower than a threshold based on the above-mentioned receipt quality information. In a case where the stream relay quality is lower than a threshold (Step S60: YES), the process goes to Step S61. In a case where the stream relay quality is not lower than a threshold (Step S60: NO), the process goes to Step S67.

In Step S61, the stream stop request message is sent to the upstream node Nn.

In Step S62, the connection release request message is sent to the upstream node Nn.

In Step S63, it is judged whether or not the own node device is a representative node unifying messages. In a case where the own node device is the representative node (Step S63: YES), the process goes to Step S64. In a case where the own node device is not the representative node (Step S63: NO), the process goes to Step S65.

In Step S64, an own node device topology withdrawal report message is stored in the memory area for unifying messages.

In Step S65, an own node device topology withdrawal report message is sent to the upstream node Nn connected to the own node device.

In Step S66, the autonomous reconnection event occurs and the autonomous reconnection event flag is set as 1. Accordingly, it is judged that the autonomous reconnection event occurs in Step S2.

In Step S67, it is judged whether or not the connection destination candidate packet P is received from the upstream node Nn. In a case where the connection destination candidate packet P is received (Step S67: YES), the process goes to Step S68. In a case where the connection destination candidate packet P is not received (Step S67: NO), the process goes to Step S74.

In Step S68, it is judged whether or not the connection destination candidate information to be registered (cached) in the connection candidate management table is included in thus received connection destination candidate packet P. For example, as mentioned above, in a case where the node Nn applicable to the attribute information of the own node device is indicated in the connection destination candidate information included in the connection destination candidate packet P, it is judged that the connection destination candidate information to be registered is included. Then, in a case where the connection destination candidate information to be registered (cached) in the connection candidate management table is included in the connection destination candidate packet P (Step S68: YES), the process goes to Step S69. In a case where the connection destination candidate information to be registered (cached) in the connection candidate management table is not included in the connection destination candidate packet P (Step S68: NO), the process goes to Step S70.

In Step S69, a reconnection destination candidate of the own node device is specified, and the connection destination candidate information and the time at that point (registration time) are additionally registered in the connection candidate management table.

In Step S70, it is judged whether or not the downstream node Nn is connected to the own node device. In a case where the downstream node Nn is connected to the own node device (Step S70: YES), thus received connection destination candidate packet P is transferred (relayed) to the downstream node Nn (Step S71) and the process goes to Step S72. In a case where the downstream node Nn is not connected to the own node device (Step S70: NO), the process goes to Step S72.

In Step S72, it is judged whether or not the number of downstream nodes Nn connected to the own node device reaches the connection allowable number of the own node device. In a case where the number of downstream nodes Nn reaches the connection allowable number of the own node device (Step S72: YES), the process returns to Step S9 shown in FIG. 12. In a case where the number of downstream nodes Nn does not reach the connection allowable number of the own node device (capacity remaining) (Step S72: NO), the process goes to Step S73.

In Step S73, thus received connection destination candidate packet P is stored in the memory area for storing the connection destination candidate packet.

In Step S74, it is judged whether or not the node attribute update packet PA is received from the upstream node Nn. In a case where the node attribute update packet PA is received (Step S74: YES), the process goes to Step S75. In a case where the node attribute update packet PA is not received (Step S74: NO), the process goes to Step S79.

In Step S75, it is judged whether or not the attribute information to be updated is included in thus received node attribute update packet PA. In a case where the attribute information to be updated is included (Step S75: YES), the process goes to Step S76. In a case where the attribute information to be updated is not included (Step S75: NO), the process goes to Step S77.

In Step S76, the attribute information registered in the connection candidate management table is updated based on the attribute information after the change which is included in the update information in the node attribute update packet PA.

In Step S77, it is judged whether or not the downstream node Nn is connected to the own node device. In a case where the downstream node Nn is connected to the own node device (Step S77: YES), thus received node attribute update packet PA is transferred (relayed) to the downstream node Nn (Step S78), and the process returns to Step S9. In a case where the downstream node Nn is not connected to the own node device (Step S77: NO), the process returns to Step S9 shown in FIG. 12.

In Step S79, it is judged whether or not the timeout event of a timer activated at the initialization time occurs. In a case where the timeout event of the timer occurs (Step S79: YES), the process goes to Step S80. In a case where the timeout event of the timer does not occur (Step S79: NO), the process returns to Step S9 shown in FIG. 12.

In Step S80, it is judged whether or not storing time of the connection destination candidate packet P which is stored in the memory area for storing the connection destination candidate packet passes over the predetermined time period. In a case where the storing time passes over the predetermined time period (Step S80: YES), the process goes to Step S81. In a case where the storing time does not pass over the predetermined time period (Step S80: NO), the process goes to Step S82.

In Step S81, the connection destination candidate information stored in the memory area for storing connection destination candidate packet is deleted.

In Step S82, it is judged whether or not the connection destination candidate information passing over the predetermined time period is registered in the connection candidate management table. In a case where it is registered in the connection candidate management table (Step S82: YES), the process goes to Step S83. In a case where it is not registered in the connection candidate management table (Step S82: NO), the process returns to Step S9 shown in FIG. 12.

In Step S83, the connection destination candidate information passing over the predetermined time period (i.e. being old) is deleted from the connection candidate management table.

(Process of Broadcast Station 10)

Figure 17:
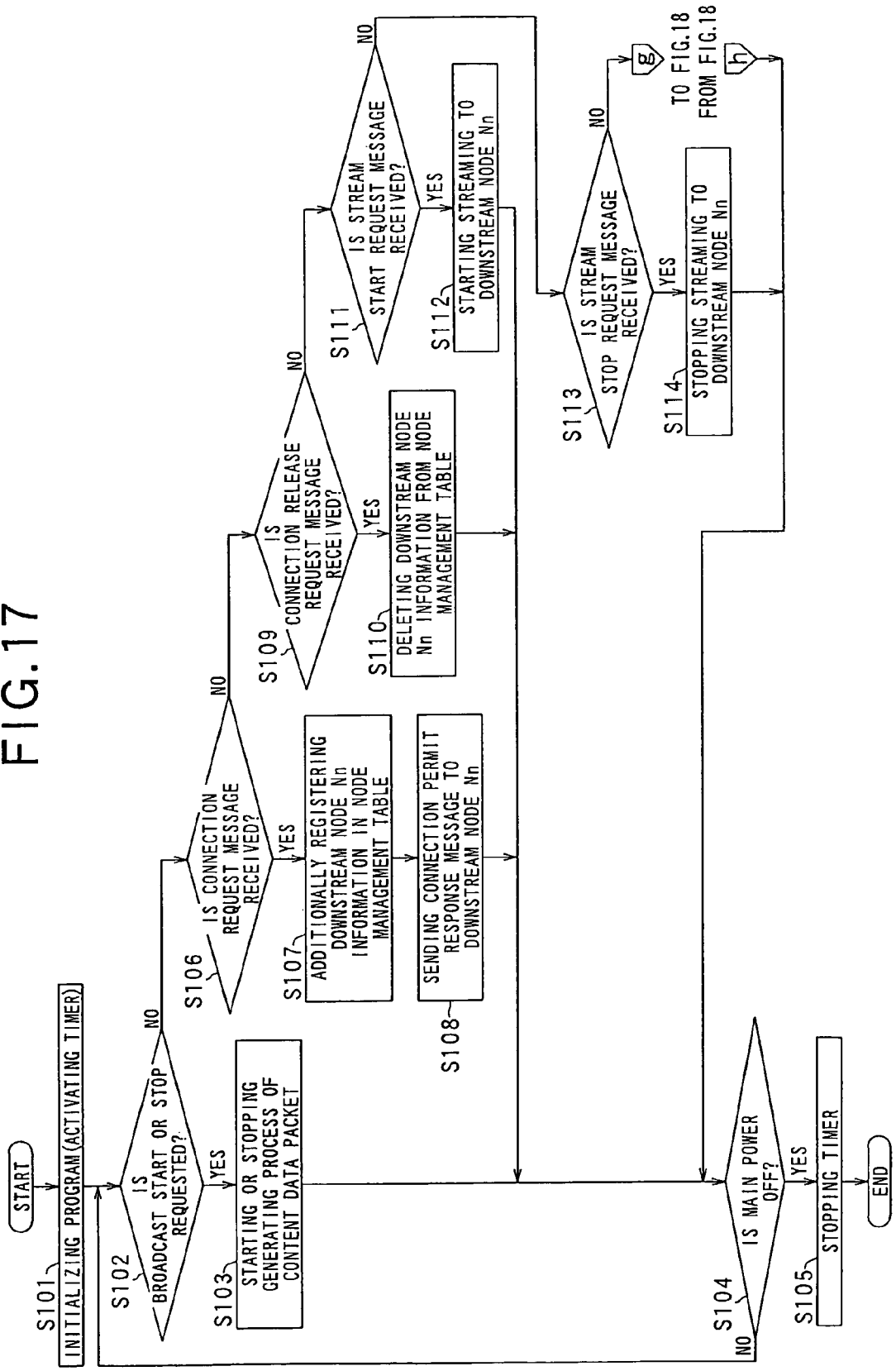
FIG. 17 is a flowchart of a process carried out by CPU 104 in the broadcast station 10.
Figure 18:
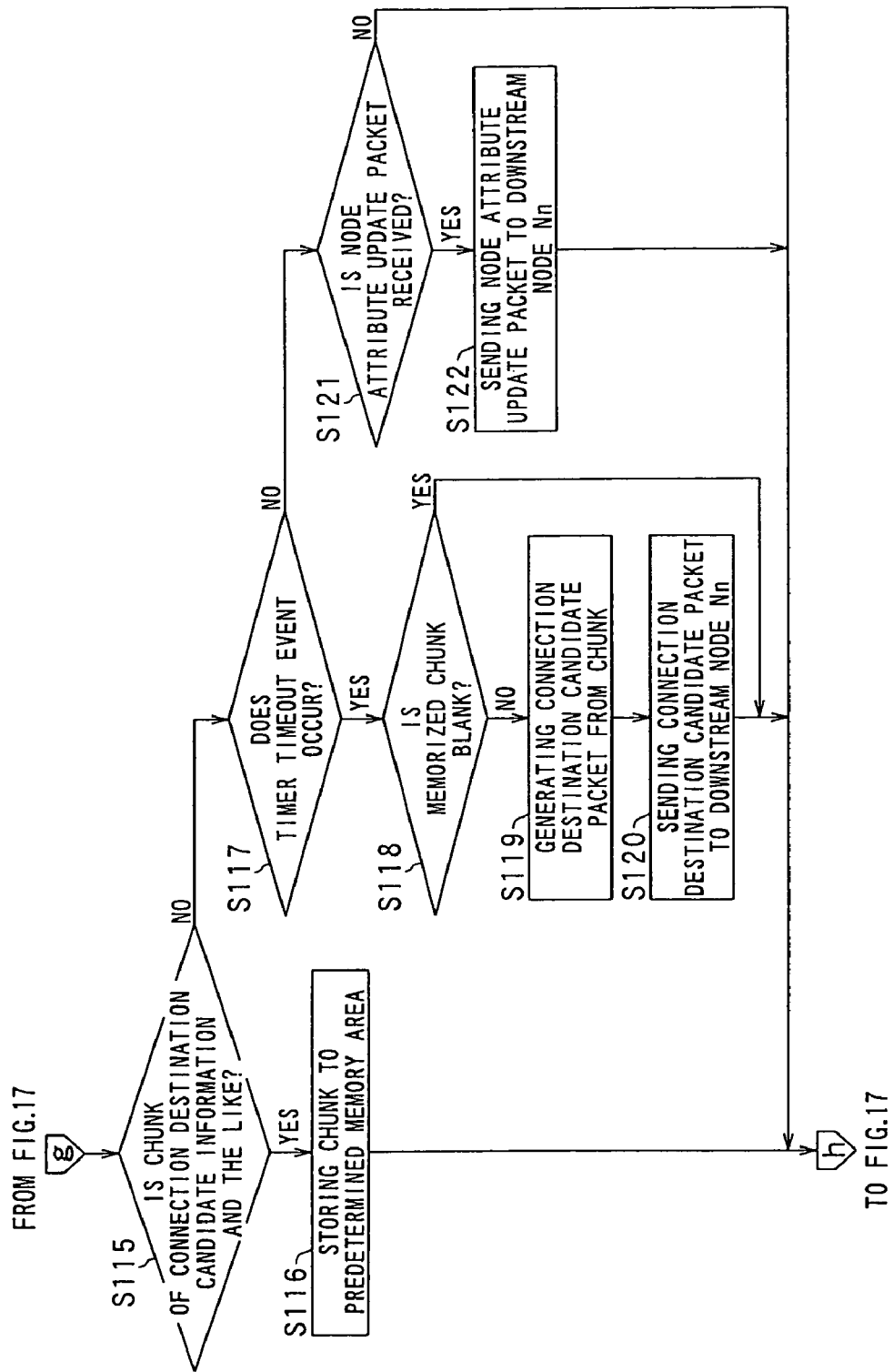
FIG. 18 is a flowchart of a process carried out by CPU 104 in the broadcast station 10.

Next, with reference to FIGS. 17 and 18, a process of CPU 104 in a broadcast station 10 is explained.

FIGS. 17 and 18 are flowcharts showing a process carried out by CPU 104 in the broadcast station 10.

The process in FIG. 17 starts by activating the broadcast station 10 by power-on of a main power 101. When the process starts, in Step S101, various types of programs in the broadcast station 10 are initialized, and timers for various cycle processes which are carried out when time-out event occurs is activated. Here, the registration request message of the broadcast station (including location information or the like of the broadcast station 10) is sent to the connection destination introduction server 20 when the process starts.

In Step S102, it is judged whether or not broadcast start or stop is requested from the broadcast operator. In a case where broadcast start or stop is requested, the process goes to Step S103. In a case where broadcast start or stop is not requested, the process goes to Step S106.

In Step S103, a content data packet generation process is started or stopped in response to broadcast start request or stop request. When the content data packet generation process starts, content data recorded in a hard disk unit 103 are accessed to read out, the content data packet is generated in synchronization with a system timer, and the packet is stored in a buffer memory. On the other hand, when the content data packet generation process is stopped, access to read out content data recorded in the hard disk unit 103 is stopped and the buffer memory is cleared.

In Step S104, it is judged whether or not the main power 101 of the broadcast station is off. In a case where the main power 101 is off (Step S104: YES), the process goes to Step S105. In a case where the main power 101 is not off (Step S104: NO), the process returns to Step S102.

In Step S105, when the main power 101 becomes off, various programs are finished, then the timers for various cycle process stop, and the process is finished. Here, when the process is finished, a delete request message of the broadcast station (including location information of the broadcast station 10, and the like) is sent to the connection destination introduction server 20.

In Step S106, it is judged whether or not a connection request message is received from the downstream node Nn. In a case where the connection request message is received (Step S106: YES), the process goes to Step S107. In a case where the connection request message is not received (Step S106: NO), the process goes to Step S109.

In Step S107, information of the downstream node Nn (e.g. IP address and port number) is additionally registered in the node management table.

In Step S108, a connection permit response message is sent to the downstream node Nn.

In Step S109, it is judged whether or not a connection release request message is received from the downstream node Nn. In a case where the connection release request message is received (Step S109: YES), the process goes to Step S110. In a case where the connection release request message is not received (Step S109: NO), the process goes to Step S111.

In Step S110, information of the downstream node Nn (e.g. IP address and port number) is deleted from the node management table.

In Step S111, it is judged whether or not a stream start request message is received from the downstream node Nn. In a case where the stream start request message is received (Step S111: YES), the process goes to Step S112. In a case where the stream start request message is not received (Step S111: NO), the process goes to Step S113.

In Step S112, content stream broadcast to the downstream node Nn starts (streaming starting).

In Step S113, it is judged whether or not a stream stop request message is received from the downstream node Nn. In a case where the stream stop request message is received (Step S113: YES), the process goes to Step S114. In a case where the stream stop request message is not received (Step S113: NO), the process goes to Step S115 shown in FIG. 18.

In Step S114, the content stream broadcast to the downstream node Nn is stopped (streaming being stopped).

Next in Step S115 shown in FIG. 17, it is judged whether or not a chunk C of the connection destination candidate information from the connection destination introduction server 20 and a broadcast instruction message indicative of a broadcast instruction of the connection destination candidate information are received. In a case where the chunk C and the like of the connection destination candidate information are received (Step S115: YES), the process goes to Step S116. In a case where the chunk C and the like of the connection destination candidate information are not received (Step S115: NO), the process goes to Step S117.

In Step S116, thus received chunk C is stored in the predetermined memory area of the main memory unit 102.

In Step S117, it is judged whether or not a timeout event of the timer, which is activated at the time of initialization, occurs. In a case where the timeout event of the timer occurs (Step S117: YES), the process goes to Step S118. In a case where the timeout event of the timer does not occur (Step S117: NO), the process returns to Step S104.

In Step S118, it is judged whether or not the memorized chunk C is blank, in other words, the chunk C is memorized in the above-mentioned memory area of the main memory unit 102. In a case where the chunk C is blank (Step S118: YES), the process returns to Step S104 shown in FIG. 17. In a case where the chunk C is not blank (Step S118: NO), the process goes to Step S119.

In Step S119, the connection destination candidate packet P including the connection destination candidate information is generated from thus memorized chunk C.

In Step S120, thus generated connection destination candidate packet P is sent (broadcasted) to the downstream node Nn.

In Step S121, it is judged whether or not a node attribute update packet PA is received from the connection destination introduction server 20. In a case where the node attribute update packet PA is received (Step S121: YES), the process goes to Step S122. In a case where the node attribute update packet PA is not received (Step S121: NO), the process returns to Step S104 shown in FIG. 17.

In Step S122, thus received node attribute update packet PA is sent (broadcasted) to the downstream node Nn.

(Process of Connection Destination Introduction Server 20)

Figure 19:
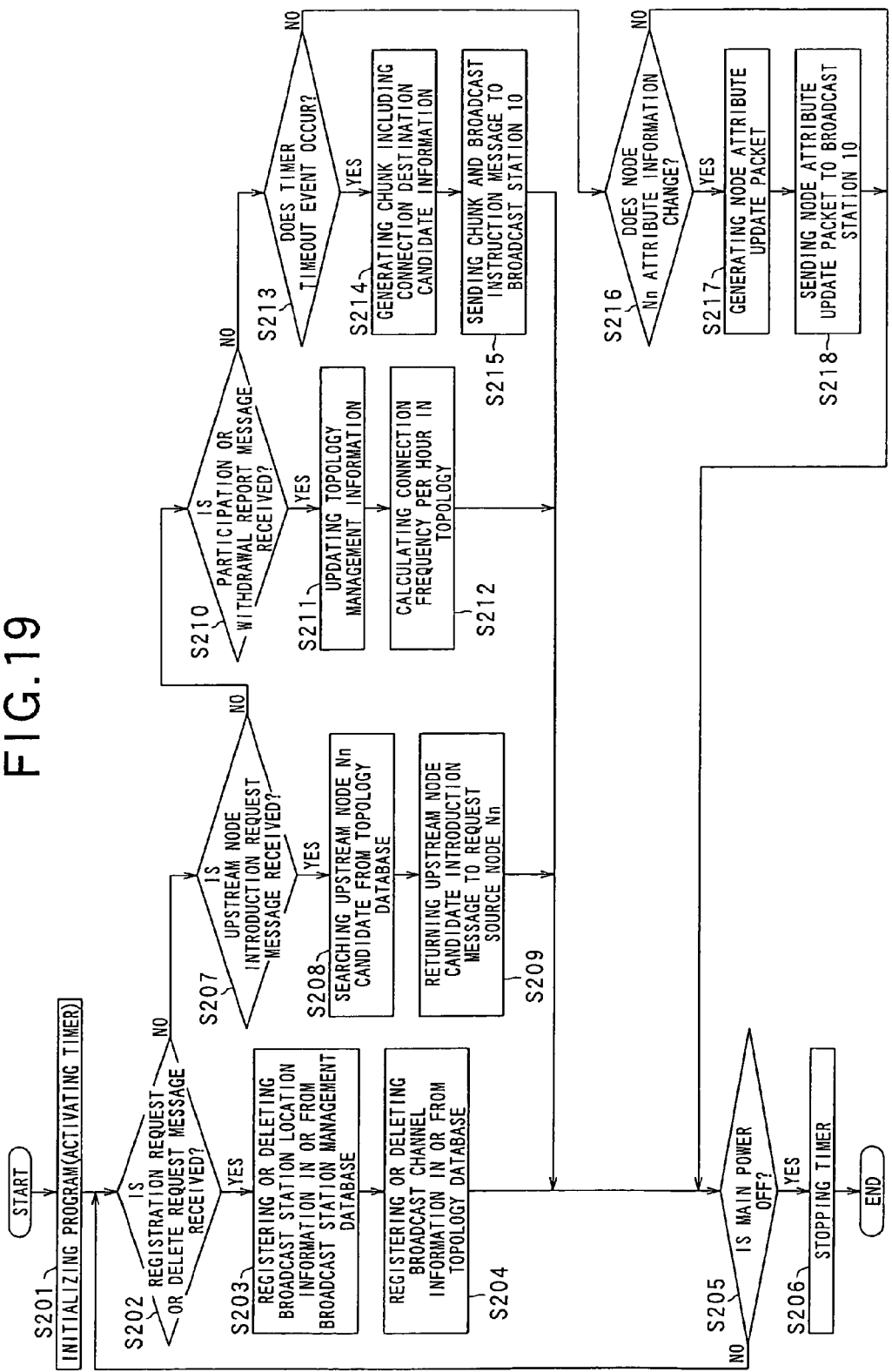
FIG. 19 is a flowchart of a process carried out by CPU 204 in the connection destination introduction server 20.

Next, with reference to FIG. 19, a process of CPU 204 in a connection destination introduction server 20 is explained.

FIG. 19 is a flowchart showing a process carried out by the CPU 204 in the connection destination introduction server 20.

The process in FIG. 19 starts by activating the connection destination introduction server 20 by power-on of a main power 201. When the process starts, in Step S201, various types of programs in the connection destination introduction server 20 are initialized, and a timer for various cycle processes is activated when time-out event occurs.

In Step S202, it is judged whether or not a registration request message or a delete request message is received from the broadcast station 10. In a case where the registration request message or the delete request message is received (Step S202: YES), the process goes to Step S203. In a case where a registration request message and a delete request message are not received (Step S202: NO), the process goes to Step S207.

In Step S203, location information included in the registration request message, and the like are registered in the broadcast station management database in correspondence with the broadcast channel information. Or the location information included in the delete request message, and the like are deleted from the broadcast station management database.

In Step S204, the broadcast channel information corresponding to the broadcast station 10 registered in the location information is registered in the topology database. Or the broadcast channel information is deleted from a topology database.

In Step S205, it is judged whether or not the main power 201 of the connection destination introduction server 20 is turned off. In a case where the main power 201 is turned off (Step S205: YES), the process goes to Step S206. In a case where the main power 201 is not turned off (Step S205: NO), the process returns to Step S202.

In Step S206, when the main power 201 becomes turnoff, various programs are finished, whereby the timers for various cycle process stop. Then the process ends.

In Step S207, it is judged whether or not an upstream node introduction request message is received from the node Nn. In a case where the upstream node introduction request message is received (Step S207: YES), the process goes to Step S208. In a case where an upstream node introduction request message is not received (Step S207: NO), the process goes to Step S210.

In Step S208, a candidate of the upstream node Nn is searched from the topology database, and network address information and attribute information of one or more candidate of the upstream node Nn thus searched is acquired.

In Step S209, the upstream node candidate introduction message including the network address information and the attribute information of thus acquired upstream node Nn is returned to the node Nn sending the upstream node introduction request message.

In Step S210, it is judged whether or not a participation report message or a withdrawal report message is received from the node Nn. In a case where the participation report message or the withdrawal report message is received (Step S210: YES), the process goes to Step S211. In a case where the participation report message and the withdrawal report message are not received (Step S210: NO), the process goes to Step S213.

In Step S211, topology management information registered in the topology database is updated in response to the participation report message or the withdrawal report message. Accordingly the topology fluctuation is reflected.

In Step S212, a connection frequency per hour in the topology is calculated.

In Step S213, it is judged whether or not a timeout event of the timer, which is activated at the time of initialization, occurs (that is, broadcast of connection destination candidate starts). In a case where the timeout event of the timer occurs (Step S213: YES), the process goes to Step S214. In a case where the timeout event of the timer does not occur (Step S213: NO), the process goes to Step S216.

In Step S214, plural pieces of the latest downstream connectable nodes Nn are extracted as a node Nn to be a reconnection destination candidate, based on the topology management information registered in the topology database, and the chunk C including connection destination candidate information is generated.

In Step S215, a broadcast instruction message indicative of broadcast instruction of thus generated chunk C and the connection destination candidate information is sent to the broadcast station 10.

In Step S216, it is judged whether or not the attribute information of the node Nn in the topology management information registered in the topology database changes. In a case where the attribute information of the node Nn changes (Step S216: YES), the process goes to Step S217. In a case where the attribute information of the node Nn does not change (Step S216: NO), the process returns to Step S205.

In Step S217, the node attribute update packet PA which stores update information including the network address information of the node Nn where the attribute information changes and the attribute information after change is generated.

In Step S218, the node attribute update packet PA thus generated is sent to the broadcast station 10.

As explained above, according to the above-mentioned embodiment, the connection destination candidate packet P including the connection destination candidate information from the broadcast station 10 is broadcasted from the upstream node Nn to the downstream node Nn in the topology, and respective nodes Nn receiving the connection destination candidate packet P specify the node Nn applicable to the own attribute information as the own reconnection destination candidate, among plural nodes Nn indicated in the connection destination candidate information included in this, and memorize the connection destination candidate information related to thus specified node Nn. Then, in a case where respective nodes Nn release the connection between the upstream node Nn or the broadcast station 10 which the own currently connects with when the autonomous reconnection event occurs and newly reconnect to another upstream node Nn, the respective nodes Nn select one node Nn as a reconnection destination, among the above-mentioned specified reconnection destination candidates, and reconnect the upstream node Nn being thus selected reconnection destination. According to such the configuration, it is possible to restrain inquiries of the upstream node Nn to be reconnected, to the connection destination introduction server 20 managing the topology. Therefore, it is possible to provide a candidate having optimality equal to that of the connection destination candidate obtained from the connection destination introduction server 20, while reducing load put on the connection destination introduction server 20 (restraining load concentration) as well, so that the topology can be stabilized.

Further, among plural nodes Nn indicated by the connection destination candidate information, the node Nn having a smaller hierarchy level value (i.e. in higher hierarchy) than that of the own node device or the same hierarchy level value is specified as a reconnection destination candidate for a node Nn applicable to the own node device attribute information. According to such the configuration, it is possible to prevent the delivery route from cycling.

Further, among plural nodes Nn indicated by the connection destination candidate information, the node Nn applicable to an NAT traversal attribute of the own node device is specified as a reconnection destination candidate for a node Nn applicable to the own node device attribute information. According to this configuration, it is possible to prevent communication establishment from failure. Further, since the NAT traversal attribute of the reconnection destination is registered in the connection candidate management table, it is possible to omit some processing time for trying establishing connection with the node Nn registered in the connection candidate management table and reduce time up to connection establishment.

Further, among plural nodes Nn indicated by the connection destination candidate information in a single connection destination candidate packet P, the smaller number of nodes Nn are randomly specified as the reconnection destination candidate. According to such the configuration, it is possible to restrain the number of the reconnection destination candidates specified from a single connection destination candidate packet P and disperse the reconnection candidates.

Further, in a case where the node Nn attribute information changes due to reconnection, the node attribute update packet PA storing update information including attribute information after the change is broadcasted from the upstream node Nn to the downstream node Nn of the topology, and the node Nn receiving the node attribute update packet PA examines whether or not the corresponding node Nn is registered in the own reconnection candidate management table. In a case where it is registered, the attribute information of the corresponding node Nn is replaced with attribute information including the node attribute update packet PA. According to such the configuration, it is possible to amend within relatively short delay time and provide a reconnection destination candidate of good quality equal to that of the connection destination introduction server 20.

Further, in a case where the number of the downstream node connections does not reach the connection allowable number, respective nodes Nn store the connection destination candidate packet P in the memory area for storing the connection destination candidate packet for the predetermined time period. In a case where a new node Nn connects as the downstream node during this storing time period, the respective nodes Nn transfer thus stored connection destination candidate packet P to the downstream node Nn. According to such the configuration, it is possible that the node Nn newly participating in the topology also obtains the connection destination candidate information immediately.

Further, since the participation or withdrawal report messages are collected in a lump by the representative node Nn and sent to the connection destination introduction server 20, it is possible to reduce amount of communication to the connection destination introduction server 20.

Thus, as a result, it is possible to reduce equipment investment for the server, which is necessary to secure scalability of the topology.

Here, in the above-mentioned embodiment, when a given node Nn specifies the reconnection destination candidate from the connection destination candidate packet P, the delivery route is prevented from cycling on conditions that a hierarchy level value is smaller than or same as that of the own node device. However, nodes having larger hierarchy level value than that of the own node device can be selected when respective nodes Nn previously remember the neighbor node group.

Figure 20:
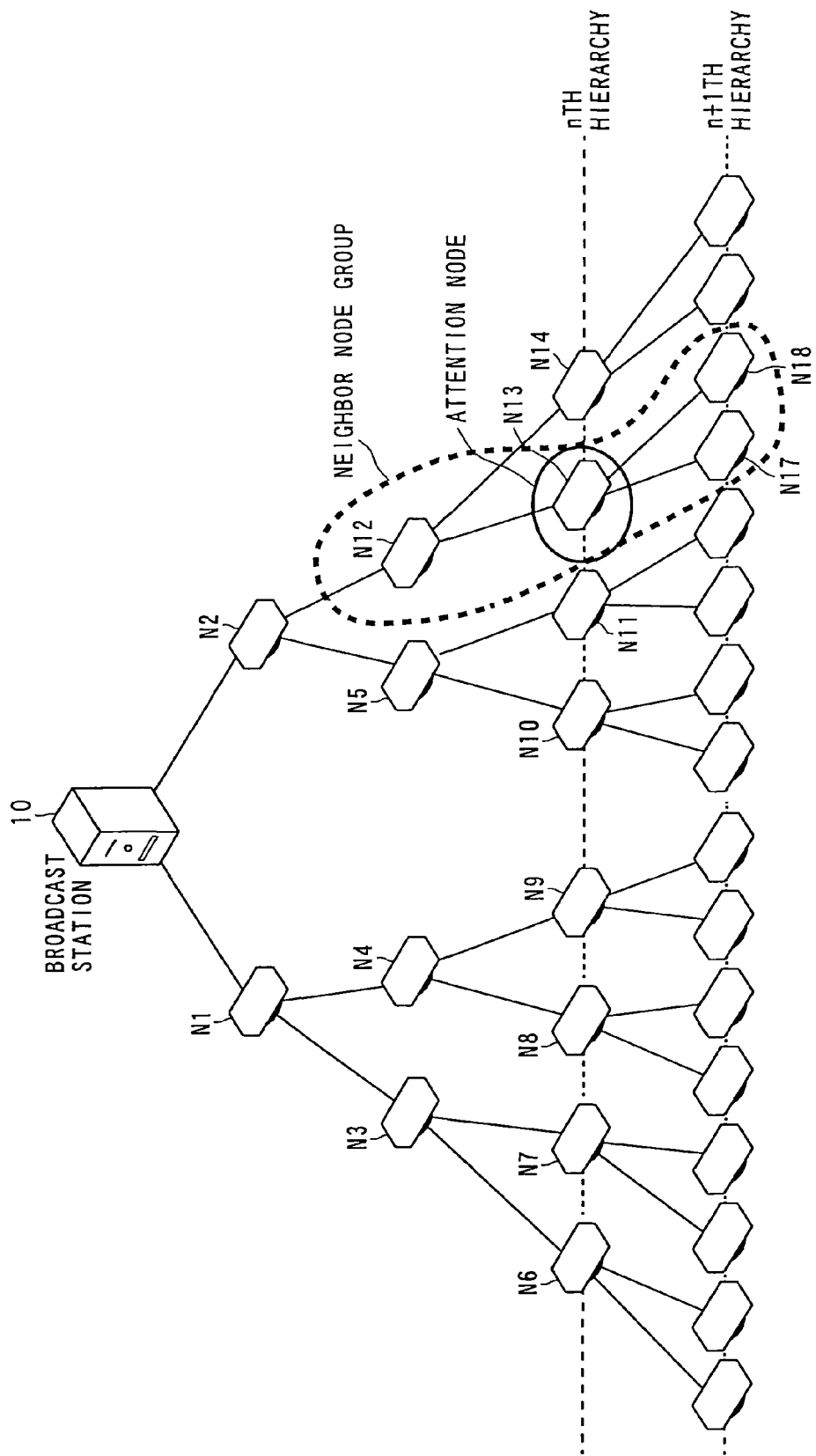
FIG. 20 is a view showing a node group adjacent to the attention node in topology.

FIG. 20 is a view showing a neighbor node group with respect to an attention node N13 in the topology. In an example of FIG. 20, the attention node N13 memorizes information related to the nodes N12, N17, and N18 being neighbor nodes which are 1 hop (node) farther from the own as a center in downstream direction and the upstream direction, and the attention node N13 is located in the nth hierarchy. In this case, since the attention node N13 knows existence of neighbor nodes one hop downstream from the immediate downstream node connected to the node N13, when specifying reconnection destination candidate from the connection destination candidate packet P, the node N13 first specifies the reconnection destination candidate of lower than the n+1th hierarchy, and then excludes neighbor nodes N17 and N18 in downstream direction from thus specified candidates. Therefore, it is possible to alleviate the conditions for specifying (selecting) the reconnection destination candidate from the connection destination candidate packet P, specify more reconnection candidates and register them in the reconnection candidate management table. Here, in order to know presence of neighbor nodes, respective node Nn sends advertisement packet for advertising presence of the own node device to the surrounding nodes Nn, with restriction of node Nn relay (transfer) frequency.

What is claimed is:

1. A node device in a tree-type broadcast system formed by participation of a plurality of node devices that form a plurality of hierarchy levels, wherein a broadcast device is located at a top of the plurality of hierarchy levels and the node devices are connected in a tree-like shape through a communication circuit to enable information broadcasted by the broadcast device to be sequentially transferred from a node device among the plurality of node devices located at a higher hierarchy level to a node device among the plurality of node devices located at a lower hierarchy level, the node device comprising:

a connection information receiving unit configured to receive connection destination candidate information, which is broadcasted from the broadcast device, is sequentially transferred through the plurality of node devices from the node device located at an upper hierarchy level to the node device located at a lower hierarchy level, and indicates from among the plurality of node devices one or more node devices to be reconnection destination candidates, including at least network address information of the node devices to be the reconnection destination candidates;

a reconnection destination candidate specifying unit configured to specify one or more node devices out of the node devices to be reconnection destination candidates indicated in the received connection destination candidate information suitable for attribute information of the node device;

a reconnection destination candidate memory unit configured to memorize at least network address information of specified node devices, the specified node devices being the node devices out of the node devices to be reconnection destination candidates specified by the reconnection destination candidate specifying unit; and a connection processing unit configured to carry out a connection process of selecting one node device as a reconnection destination node device out of the specified node devices memorized in the reconnection destination candidate memory unit and to connect to the reconnection destination node device based on the network address information of the reconnection destination node device, in response to determining that the node device is newly reconnected to the reconnection destination node device.

2. The node device according to claim 1, further comprising:

a connection destination candidate information transfer unit configured to transfer the connection destination candidate information received by the connection information receiving unit from a node device among the plurality of node devices located in a higher hierarchy level than the node device to a node device among the plurality of node devices located in a lower hierarchy level than the node device.

3. The node device according to claim 1, further comprising:
an allowable number judgment unit configured to judge whether a number of node devices located in a lower hierarchy level connected to the node device reaches an allowable number of the node devices connectable to the lower hierarchy level of the node device, wherein
the connection destination candidate information transferring unit transfers the received connection destination candidate information to node devices located in a lower hierarchy level connected to the node device, in response to judging that the number of the node devices reaches the allowable number by the allowable number judgment unit.

4. The node device according to claim 1,
wherein the connection destination candidate information includes information indicative of a hierarchy level in the system of node devices to be the reconnection destination candidates, the attribute information includes information indicative of a hierarchy level in the system of the node device, and the reconnection destination candidate specifying unit specifies node devices located in a hierarchy level higher than or the same as the node device as the specified node devices, based on the information indicative of the hierarchy level, among node devices to be the reconnection destination candidates in the received connection destination candidate information.

5. The node device according to claim 1,
wherein the connection destination candidate information includes information indicative of a communication method in the system of the node devices to be the reconnection destination candidates, the attribute information includes information indicative of a communication method of the system of the node device, and the reconnection destination candidate specifying unit specifies node devices applicable to the communication method of the node device as the specified node devices, based on the information indicative of the communication method, among node devices to be the reconnection destination candidates in the received connection destination candidate information.

6. The node device according to claim 1,
wherein the connection destination candidate information indicates a plurality of node devices to be reconnection destination candidates, and the reconnection destination candidate specifying unit randomly specifies node devices of number smaller than an appropriate number as the specified node devices, among node devices to be the reconnection destination candidates in the received connection destination candidate information.

7. The node device according to claim 1,
wherein the reconnection destination candidate memory unit memorizes the node device attribute information in addition to network address information of the specified node devices, the node device, further comprising:
an update information receiving unit configured to receive update information which is broadcasted from a node device among the plurality of node devices located in a higher hierarchy level than the node device which is currently connected to the node device or from the broadcast device and which includes attribute information after the change of a node device having attribute information changed by reconnection in the tree-type broadcast system; and
an attribute information update unit configured to update attribute information memorized in the reconnection destination candidate memory unit, based on attribute information included in the update information.

8. The node device according to claim 1,
wherein the connection destination candidate information is generated by a server device managing connection modes of node devices in the tree-type broadcast system and provided to the broadcast device, the node device, further comprising:
a report information receiving unit that receives report information indicative of a participation report in the tree-type broadcast system or a withdrawal report from the tree-type broadcast system, which is sent from a node device among the plurality of node devices in a lower hierarchy level connected to the node device;
a report information storing unit that stores the received report information; and
a report information sending unit that sends the report information stored every predetermined time period to the server device in a case where the node device is a representative node device sending the report information to the server device as a representative, and which sends the received report information to a node device among the plurality of node devices in a higher hierarchy level connected to the node device in a case where the node device is not the representative node device.

9. The node device according to claim 1, further comprising:
an allowable number judgment unit configured to judge whether a number of node devices located in a lower hierarchy level connected to the node device reaches an allowable number of the node devices connectable to the lower hierarchy level of the node device; and
a connection information storing unit that stores the received connection destination candidate information for a predetermined time in order to transfer the received connection destination candidate information to a node device among the plurality of node devices to be connected later to the node device in the lower hierarchy level.

10. A non-transitory computer-readable medium recording a reconnection process program to be performed by a node device in a tree-type broadcast system which is formed by participation of a plurality of node devices that form a plurality of hierarchy levels, wherein a broadcast device is located at a top of the plurality of hierarchy levels and the node devices are connected in a tree-like shape through a communication circuit to enable information broadcasted by the broad device to be sequentially transferred from a node device located at a higher hierarchy level to a node device located at a lower hierarchy level, the program comprising
receiving connection destination candidate information, which is broadcast from the broadcast device and sequentially transferred from the node device located at the higher hierarchy level to the node device located at the lower hierarchy level, indicating node devices to be reconnection destination candidates, and including at least network address information of the node devices to be the reconnection destination candidates;
specifying in a reconnection destination candidate specifying unit one or more node devices out of the node devices to be reconnection destination candidates indicated in the received connection destination candidate information suitable for attribute information of the node device;

memorizing in a reconnection destination candidate memory unit at least network address information of specified node devices, the specified node devices being the node devices out of the node devices to be reconnection destination candidates specified by the reconnection destination candidate specifying unit; and carrying out a connection process of selecting one node device as a reconnection destination node device out of the specified node devices memorized in the reconnection destination candidate memory unit and connecting to the reconnection destination node device, in response to determining that the node device is newly reconnected to the reconnection destination node device.

11. A tree-type broadcast system formed by participation of a plurality of node devices that form a plurality of hierarchy levels, wherein a broadcast device is located at a top of the plurality of hierarchy levels and the node devices are connected in a tree-like shape through a communication circuit to enable information broadcasted by the broadcast device to be sequentially transferred from a node device among the plurality of node devices located at a higher hierarchy level to a node device among the plurality of node devices located at a lower hierarchy level, the server device managing connection modes of the node devices in the tree-type broadcast system comprising:

a connection destination candidate information generating unit configured to generate connection destination candidate information which indicates one or more node devices to be reconnection destination candidates of a node device in the tree-type broadcast system and which includes at least network address information of the node devices to be reconnection destination candidates, based on information indicative of connection modes; and a connection destination candidate information sending unit configured to send the generated connection destination candidate information and broadcast instruction information indicative of broadcast instruction of the connection destination candidate information to the broadcast device, the node device in the tree-type broadcast system comprising:

a connection information receiving unit configured to receive connection destination candidate information, which is broadcasted from the broadcast device, is sequentially transferred through the plurality of node devices from the node device located at an upper hierarchy level to the node device located at a lower hierarchy level, and indicates from among the plurality of node devices one or more node devices to be reconnection destination candidates, including at least network address information of the node devices to be the reconnection destination candidates;

a reconnection destination candidate specifying unit configured to specify one or more node devices out of the node devices to be reconnection destination candidates indicated in the received connection destination candidate information suitable for attribute information of the node device;

a reconnection destination candidate memory unit configured to memorize at least network address information of specified node devices, the specified node devices being the node devices out of the node devices to be reconnection destination candidates specified by the reconnection destination candidate specifying unit; and a connection processing unit configured to carry out a connection process of selecting one node device as a reconnection destination node device out of the specified node devices memorized in the reconnection destination candidate memory unit to connect to the connection destination node device based on the network address information of the reconnection destination node device, in response to determining that the node device is newly reconnected to the reconnection destination node device.

12. A reconnection process method of a node device in a tree-type broadcast system formed by participation of a plurality of node devices that form a plurality of hierarchy levels, wherein a broadcast device is located at a top of the plurality of hierarchy levels and the node devices are connected in a tree-like shape through a communication circuit to enable information broadcasted by the broadcast device to be sequentially transferred from a node device among the plurality of node devices located at a higher hierarchy level to a node device among the plurality of node devices located at a lower hierarchy level, the method comprising:

receiving connection destination candidate information, which is broadcast from the broadcast device and sequentially transferred from the node device located at the higher hierarchy level to the node device located at the lower hierarchy level, indicating node devices to be reconnection destination candidates, and including at least network address information of the node devices to be the reconnection destination candidates;

specifying in a reconnection destination candidate specifying unit one or more node devices out of the node devices to be reconnection destination candidates indicated in the received connection destination candidate information suitable for attribute information of the node device receiving connection destination candidate information;

memorizing in a reconnection destination candidate memory unit at least network address information of specified node devices, the specified node devices being the node devices out of the node devices to be reconnection destination candidates specified by the reconnection destination candidate specifying unit; and carrying out a connection process of selecting one node device as a reconnection destination node device out of the specified node devices memorized in the reconnection destination candidate memory unit and connecting to the reconnection destination node device, in response to determining that the node device is newly reconnected to the reconnection destination node device.

* * * * *